US011408121B2

(12) United States Patent
Tran-Thi et al.

(10) Patent No.: US 11,408,121 B2
(45) Date of Patent: Aug. 9, 2022

(54) METHOD FOR SOL-GEL COATING OF TEXTILE MATERIALS

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE-CNRS-, Paris (FR); Safran Electronics & Defense, Boulogne Billancourt (FR); EUROPROTECT FRANCE SA, Epinal (FR)

(72) Inventors: Thu-Hoa Tran-Thi, Montrouge (FR); Eva Grinenval, Boulogne Billancourt (FR); Philippe Charton, Epinal (FR); Franck Tirard, Boulogne Billancourt (FR); Sebastien Chatard, Epinal (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE—CNRS—, Paris (FR); SAFRAN ELECTRONICS & DEFENSE, Boulogne-Billancourt (FR); EUROPROTECT FRANCE SA, Epinal (FR)

( * ) Notice: Subject to any disclaimer, the term of this patent is extended or adjusted under 35 U.S.C. 154(b) by 497 days.

(21) Appl. No.: 16/341,797

(22) PCT Filed: Oct. 13, 2017

(86) PCT No.: PCT/EP2017/076247
§ 371 (c)(1),
(2) Date: Jan. 8, 2020

(87) PCT Pub. No.: WO2018/069528
PCT Pub. Date: Apr. 19, 2018

(65) Prior Publication Data

US 2020/0263349 A1 Aug. 20, 2020

(30) Foreign Application Priority Data

Oct. 14, 2016 (FR) .................................... 16 59975

(51) Int. Cl.
*D06M 13/507* (2006.01)
*C09D 7/20* (2018.01)
(Continued)

(52) U.S. Cl.
CPC ........... *D06M 13/507* (2013.01); *A41D 13/00* (2013.01); *A62B 17/006* (2013.01); *A62B 18/02* (2013.01);
(Continued)

(58) Field of Classification Search
CPC .. D06M 13/50; D06M 13/507; D06M 13/513; D06M 16/00; D06M 17/00;
(Continued)

(56) References Cited

U.S. PATENT DOCUMENTS 3,345,195 A 10/1967 Simpson
9,556,469 B2 1/2017 Marcoux et al.
(Continued)

FOREIGN PATENT DOCUMENTS

DE 202005013330 U1 11/2006
DE 102008010457 A1 9/2009
FR 2868956 A1 10/2005

OTHER PUBLICATIONS

The English translation of the International Search Report, dated Jan. 29, 2018, in the corresponding PCT Application No. PCT/EP2017/076247.
(Continued)

*Primary Examiner* — Arti Singh-Pandey

(57) ABSTRACT

The invention relates to a method for the coating of a textile material, said method comprising the following steps: d)
(Continued)

Figure 1:
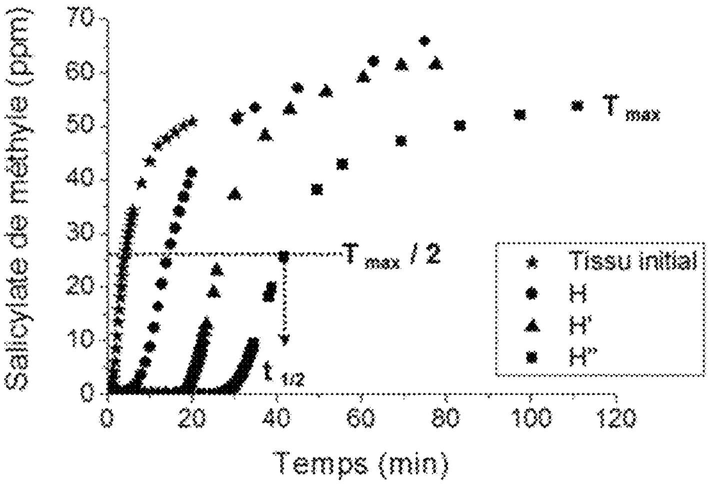

providing a coating composition comprising an aqueous solvent and an organosilicon precursor; e) impregnating the textile material with the coating composition by means of pad finishing; f) drying the impregnated textile material; characterized in that the coating composition contains no polycarboxylic acid or catalyst.

33 Claims, 7 Drawing Sheets

(51) Int. Cl.

| | |
|---|---|
| ***A41D 13/00*** | (2006.01) |
| ***A62B 17/00*** | (2006.01) |
| ***A62B 18/02*** | (2006.01) |
| ***A62B 23/00*** | (2006.01) |
| ***B01D 39/08*** | (2006.01) |
| ***C09D 183/06*** | (2006.01) |
| ***D06M 13/513*** | (2006.01) |
| ***D06M 17/00*** | (2006.01) |
| ***D06M 101/06*** | (2006.01) |
| ***D06M 101/36*** | (2006.01) |

(52) U.S. Cl.
CPC ............ *A62B 23/00* (2013.01); *B01D 39/083* (2013.01); *C09D 7/20* (2018.01); *C09D 183/06* (2013.01); *D06M 13/513* (2013.01); *D06M 17/00* (2013.01); *B01D 2239/0464* (2013.01); *B01D 2239/10* (2013.01); *D06M 2101/06* (2013.01); *D06M 2101/36* (2013.01); *D06M 2200/11* (2013.01); *D06M 2200/12* (2013.01); *D06M 2200/35* (2013.01); *D06M 2400/02* (2013.01)

(58) Field of Classification Search
CPC ......... D06M 2101/06; D06M 2101/36; D06M 2200/10; D06M 2200/11; D06M 2200/12; D06M 2200/35; D06M 2400/02; A41D 13/00; A62B 17/006; A62B 18/02; A62B 23/00; A62D 5/00; B01D 2239/0464; B01D 2239/10; B01D 39/083; C09D 7/20
See application file for complete search history.

(56) References Cited

U.S. PATENT DOCUMENTS

| | | | |
|---|---|---|---|
| 2002/0006518 | A1 | 1/2002 | Lustig et al. |
| 2009/0223411 | A1 | 9/2009 | Higgins et al. |

OTHER PUBLICATIONS

Stefan Brzezinski et al: “Applying the sol-gel method to the deposition of nanocoats on textiles to improve their abrasion resistance”, Journal of Applied Polymer Science, vol. 125, No. 4, Feb. 1, 2012 (Feb. 1, 2012), pp. 3058-3067, XP055026343.

Database WPI, Week 200032, Thomson Scientific, London, GB; AN 2000-369738, XP002773235.

A

B

Key:

Tissu initial = Original fabric

Salicylate de methyl = Methyl salicylate

Temps = Time

Dépôts = Depositions

A B

Key:

Salicylate de methyl = Methyl salicylate

Temps = Time

Blanc = Blank

Charbon actif = Activated carbon

Formule = Formula

A B

A B

Key:

Février = February

Key:

Nombre d'onde = Wave number

Tissu initial = Original fabric

Avant abrasion = Before abrasion

Après abrasion = After abrasion

Key:

| | | | |
|---|---|---|---|
| **Sans tissue** = | Without fabric | **Salicylate de methyl** = | Methyl salicylate |
| **Tissu seul** = | Fabric alone | **Temps** = | Time |
| **Tissu + granules** = | Fabric + pellets | | |

METHOD FOR SOL-GEL COATING OF TEXTILE MATERIALS

This application is a National Stage Application of PCT/EP2017/076247 filed Oct. 13, 2017, which claims priority from French Patent Application No. 16 59975 filed Oct. 14, 2016. Each of the prior mentioned applications is hereby incorporated by reference herein in its entirety.

The invention relates to a novel method for coating textile materials, for the preparation of coated textiles having gas-barrier properties.

Today, the use of activated carbon in gas filtration is an adequate solution. However, activated carbon is poor at trapping small polar toxic molecules and it is necessary to impregnate it with various appropriate chemicals in order to compensate for this inefficiency. Activated carbon is found in various forms of media combined with textiles: textiles impregnated with activated carbon and pressed, or activated carbon adhered to fabric. In these cases, it becomes difficult to wash the garment without losing the initial properties of the garment. A large amount of activated carbon is required in order to obtain good protection against chemical hazards, which increases the weight of the garment. In addition, to protect against splashes of corrosive and/or toxic liquids, it is necessary to have a repellent fabric that is either hydrophobic or both hydro- and oleophobic depending on the area of activity. Another desired property for the protective garment is its resistance to wear from abrasion or washing.

The most effective solutions are found in military applications. Protection against chemical and biological hazards concerns various protective items (suits, gloves, socks, hoods, masks) intended to prevent toxic agents (liquid or gaseous) from coming into contact with the skin and respiratory tract. Two lines of protective items exist: those based on impermeable materials and those that use filtering and/or breathable materials (permeable).

With a waterproof material, the wearer is fully protected from external threats, but there is no exchange of heat or moisture between the body and the external environment. Extended wear of this type of clothing therefore inexorably leads to hyperthermia problems which can become fatal. To overcome this problem, suits using materials permeable to air and water vapor have been developed. These suits use a set of textile materials comprising multiple layers. Currently, a military protective NBC suit (nuclear, biological, chemical) is composed of two layers with the following features and functions. The outer layer whose main functions are to ensure the robustness of the suit (abrasion and tear resistance) and to ensure non-penetration of liquid warfare agents. Non-penetration of liquid warfare agents corresponds to repellency (hydrophobicity/oleophobicity). This function is obtained by a fluorine resin surface treatment on the outer fabric. The inner layer performs the function of filtering gaseous toxic agents. This function is obtained using activated carbon in various forms.

The prior art highlights several inventions relating to the inner layer (filtration function) of military protective NBC suits. Activated carbon can be found in different forms.

Patent application EP 1468732 A2 discloses an activated carbon monolayer which is adhered to a textile material lining. These activated carbon beads preferably have a specific surface area of 900 to 1200 $m^2/g$.

Patent application FR 2868956 A1 discloses a mesh of activated carbon whose adsorption properties are characterized by a preferred specific surface area of about 800 to 1200 $m^2/g$ and a preferred microporosity percentage of 80% to 100%.

Patent application WO 2015163969 A2 discloses an activated carbon fabric containing metal oxide nanoparticles for gas filters or liquid purification. The specific surface area of the activated carbon fabric is given as between 100 and 2000 $m^2/g$. The average diameter of the activated carbon pores is between 0.3 and 3 nm and represents 30 to 50% of the total porosity.

An activated fabric of carbon fibers having bactericidal activity is described in patent application FR 2819420 A1. This activity is due to treatment with an adjuvant active against the effects of biological agents such as silver salts, quaternary ammonium salts, copper salts, organophosphorus compounds, and mixtures thereof. The BET specific surface area of the activated fabric is generally about 1000 to 1200 $m^2/g$.

FR2868956A1 and WO2015163969A2 do not mention the concept of washing in any manner. According to EP1468732A2, the filtering and adsorbent material (activated carbon beads adhered to the fabric) is designed to be washable and can thus be decontaminated and regenerated. However, no examples or values are given to prove this assertion FR2819420A1 concerning activated fabric of carbon fibers mentions that this complex material has good washability, among other properties. No measurements of bacteriostatic or bactericidal properties before/after washing are provided, however.

Moreover, the concepts of repellency and abrasion resistance are not mentioned for any of the media reported in all documents cited above.

Other works make use of nanoporous materials produced by sol-gel processing, for the filtration of toxic gaseous compounds and/or for protection against corrosive or toxic liquids (repellency property), or for providing antibacterial properties. These works are detailed here by category of property: filtration, repellency, resistance to washing and abrasion.

Combined textile/sol-gel media can be used in particle, gas, and liquid filtration processes (Surface Modification of Textiles. Q. Wei, 352 pages, Woodhead Publishing Series in Textiles, 1st Edition (Sep. 9, 2009). ISBN-13: 978-1845694197, Chapter II "Surface modification of fabrics for composite and filtration applications").

The state of the art reveals that, m most cases, this involves filtering liquids and particularly water. To retain pollutants such as heavy metals ($Cu2+$. $Hg2+$), silica precursors functionalized with amine groups, N-[3-(trimethoxysilyl)propyl]ethylenediamine, are used (CN 101787654). Other porous membranes based on sol-gel, deposited on textile materials (viscose, polyester, polyethylene, polypropylene, styrene-butadiene) are obtained with pore sizes ranging from 10 to 1000 nm and are used for the treatment of sewage or drinking water (CN 102371125). Liu et al. combine the use of activated carbon powder with a Ce3+-TiO2 photocatalytic system, immobilized via a sol-gel membrane, to decontaminate water and in particular to remove bisphenol A (Chem. Eng. J., 2010, 156, 3, 553-556, Adsorptive removal and oxidation of organic pollutants from water using a novel membrane).

In the field of air and gas filtration using sol-gel textiles, very few studies exist. Chen et al. proposed textile fibers (polyolefin, polyester, polyamide) impregnated with sol-gel based on vinyltrimethoxysilane, as air filters for air conditioners (CN 1632215). Other filtering textiles contain antibacterial agents (DE 102005031711 or fungicides, insecticides, repellents, odoriferous substances, essential oils (DE 202008016598). The sol-gel method is also the source for patent application SK 500372013 and relates to a multifunctional textile with camouflaging and hydrophobic effect that is self-cleaning and antibacterial. However, that patent application relates more to the properties of the fabric (weight, composition, weave, mechanical properties) than to the sol-gel formulations themselves. It only mentions that a hydrophobic coating is achieved by using a mixture of organosilanes containing a biogenic substance or nanoparticles based on silver ions, or a combination hydrophobic/antibacterial coating.

The durability of the coating is also an important property of textiles used for suits that protect against civil or military toxic chemicals. It also reflects how well the sol-gel adheres to the textile. In the case of materials such as cotton or cellulose, sol-gel adhesion is easily increased by the chemical condensation of silanol groups with the hydroxyl groups of the textile surface: the nature of the sol-gel itself is sufficient for it to adhere to certain kinds of textile fibers (J. Colloid Interf. Sci. 2005, 289, 249-261, Silane adsorption onto cellulose fibers. Hydrolysis and condensation reactions, M-C. B. Salon. M. Abdelmouleh. S. Boufi. M N. Belgacem, A. Gandini). Chemical condensation of silicon alkoxides on cellulose is known to occur after heat treatment above 100° C. (Langmuir 2005, 18, 3203-3208. Interaction of Silane Coupling Agents with Cellulose. M. Abdelmouleh, S. Boufi, A. B. Salah, M. N. Belgacem, A. Gandini). In practice, this is consistent because sol-gel depositions on fabric, for example following the method described in FR2984343A1, are dried preferably between 120 and 180° C. to ensure condensation of the sol-gel precursors, elimination of the solvents, and condensation reaction of the acid anhydrides catalyzed by sodium hypophosphite.

Patent application FR2984343A1 reports that the adhesion of the sol-gel formulation to fabric can be achieved by incorporating polycarboxylic acid and a catalyst (sodium hypophosphite). The role of the polycarboxylic acid is to promote bridging between the material and the hydrolyzed silica precursors. The role of the catalyst is to ensure grafting of the polycarboxylic acid onto the material by catalyzing the formation of an acid anhydride intermediate from the polycarboxylic acid (formation of an ester functional group with the free alcohol functional groups on the support surface). These two chemical compounds are thus intended to improve the chemical adhesion of the polycondensate chains. The durability of the coating is confirmed to be improved, particularly against abrasion and washing. Tests related to washing durability and abrasion resistance are reported for the only example embodiment given, using a sol-gel formulation based on the hydrophobic silane hexadecyltrimethoxysilane.

In many cases, the sol-gel surface is described as smooth with organic solvents, whereas the same sol-gel prepared in water leads to coatings with cracks (J. Sol-Gel Sci Technol. 2005, 34, 103-109, Hydrophobic Silica Sol Coatings on Textiles—the Influence of Solvent and Sol Concentration, B. Mahltig F. Audenaert. H. Bottcher). According to Mahltig et al., this effect occurs primarily for synthetic fibers which are relatively hydrophobic. A certain amount of a solvent less polar than water improves the wetting of the materials and thus improves the resultant coating. The article by Mahltig et al. reported the influence of an organic co-solvent in obtaining hydrophobic coatings. When the solvent is water only, cracks are observed on the coating, which accelerates abrasion of the fabric.

Other works mention the use of organosols (combined organic-inorganic sol-gel precursors) for textile impregnation. U.S. Pat. No. 8,926,744 B2 claims a large number of sol-gel formulations, most of them involving commercial silica precursors and having no dispersants in the formulations. The most important aim in this patent is the stabilization of formulations for sol storage and delayed use of the sol for various applications, such as coatings on solid substrates or impregnation of textiles with, in the latter example, dilution of the formulation with water. The method involved, the Advantex method, is complex and involves multiple steps. The first is the reaction between three silica precursors, a functionalized alkoxysilane, a cyclic siloxane, and a methylated and hydrogenated siloxane, in the presence of catalysts in order to obtain a combination of methylated and methylated-hydrogenated polysiloxane (product A). The second step corresponds to the reaction of the latter with an allyl derivative (C3H5R) carrying a functional group in the presence of a catalyst (Pt) for the conversion of SiH groups of compound A into Si—C2H4R carrying functional group R. The reactions take place in organic solvents, in particular alcohols, which must be partially removed under partial vacuum at 150° C. Variations of this protocol are proposed for the different siloxanes and silica precursors used.

For applications concerning textiles, the authors claim the feel of the fabric (softness of the treated material), the resistance to the penetration of a sewing machine needle, the abrasion resistance (9,000-31,000 Martindale test cycles for various textiles and formulations). Filtration/barrier properties are not included m the intended applications. Similarly, the concepts of porosity, pore size distribution of the coating material, and the intrapore environment or the permeability are not discussed.

In view of the above, no coated textile exists which reconciles a simple manufacturing process with filtration and repellency properties and good washability of the textile. Protective suits against civil or military toxic chemicals do indeed require:

- being able to stop polar and nonpolar toxic agents and in particular small polar molecules which are poorly trapped by activated carbon, while allowing the passage of water vapor and air;
- increasing resistance to abrasion and to washing;
- providing a compromise between comfort (permeability to air)/protection (filtration).

One object of the invention is therefore to provide a method for manufacturing a coated textile that is simple and effective and which achieves such performance.

It is to the inventors' credit to have discovered, quite unexpectedly and after much research, that it is possible to prepare textiles impregnated with a sol-gel material in a simple and effective manner without making use of polycarboxylic acid and a catalyst.

A sol-gel material is a material obtained by a sol-gel process which consists of using metal alkoxides of the formulation $M(OR)_xR'_{n-x}$ as precursors, where M is a metal in particular silicon, R an alkyl group, and R' a group carrying one or more functional groups with n=4 and x varying between 2 and 4. In the presence of water, the alkoxy groups (OR) are hydrolyzed to silanol groups (Si—OH). The latter condense by forming siloxane bonds (Si—O—Si—). Small particles less than 1 μm in size are formed, which aggregate and form clusters that remain in suspension without precipitating, forming a sol. The growth of the clusters and their condensation increases the viscosity of the medium, which gels. A porous solid material is obtained by drying the gel, with expulsion of the solvent or solvents from the polymer network that has formed (syneresis).

An object of the invention therefore relates to a method for coating a textile material, said method comprising the steps of:

a) providing a coating composition comprising an aqueous solvent and an organosilicon precursor.

b) impregnating the textile material with the coating composition by means of pad finishing, c) drying the impregnated textile material, characterized in that the coating composition contains no polycarboxylic acid or catalyst.

Unlike impregnated textiles prepared according to the prior art with a coating composition containing polycarboxylic acid, textiles obtained by the method according to the invention allow filtering polar and apolar toxic gases. Unexpectedly and surprisingly and as demonstrated in Example 2, the incorporation of a polycarboxylic acid modifies the sol-gel to render it unsuitable for gas filtration applications, particularly polar.

The coating composition also contains no catalyst. Indeed, due to the absence of polycarboxylic acid, the coating composition according to the invention does not require the presence of a catalyst for the formation of an acid anhydride intermediate from polycarboxylic acid, for example phosphorus catalysts such as sodium hypophosphite. The coating composition therefore contains no such catalyst. The term catalyst within the meaning of the invention also includes acids, particularly mineral acids, such as hydrochloric acid, and monocarboxylic acids.

Advantageously, the coating composition also contains no surfactant. Indeed, the presence of a surfactant alters the sol-gel by inducing the formation of a network of large pores, meaning mesopores (20-500 Å) or even macropores (>500 Å) which would adversely affect the filtration property.

The impregnated textile material according to the invention is flexible, lightweight, breathable, repellent, resistant to abrasion and to multiple washings, and has barrier properties against polar and non-polar toxic gases.

The textile material used may be of any type. It may for example be a woven fabric, a nonwoven fabric, or a knit, preferably a woven fabric. Advantageously, the textile material comprises fibers having hydrolysable functional groups, such as hydroxyl functional groups. An example of such a fiber is the cellulose present in natural fibers such as cotton or in synthetic fibers such as viscose. Preferably, these are viscose fibers. Fibers having hydrolysable functional groups may be used alone, combined with each other and/or combined with other synthetic fibers such as fibers of polyamide, polyamide/imide, polymeta-phenylene terephthalamide, polypara-phenylene terephthalamide, acrylic, modacrylic, polyethylene terephthalate, oxidized polyacrylonitrile. In a preferred embodiment, the textile material is a material based on an intimate mixture of viscose and synthetic fibers, preferably polyamide fibers, particularly aromatic polyamide. An example of such a fabric is 50:50 Kermel®/Lenzing FR®.

The aqueous solvent used in the coating composition may be water or a mixture of water and an organic solvent, particularly polar, protic or aproic. This organic solvent may for example be selected among the C1 to C4 linear aliphatic alcohols, in particular methanol, ethanol and propan-1-ol, and acetonitrile. Preferably, the organic solvent is ethanol or acetonitrile. The aqueous solvent advantageously contains 50% to 100% water by volume, preferably 85% to 100%.

The aqueous solvent is advantageously 50 to 92% of the coating composition by volume, preferably 65 to 92%.

The organosilicon precursor used in the coating composition may comprise a single organosilicon precursor or a mixture of organosilicon precursors. It is advantageously selected among tetramethoxysilane (TMOS), tetraethoxysilane (TEOS), methyl trimethoxysilane (MTM), methyl triethoxysilane (MTE), phenyltrimethoxysilane (PhTMOS), phenyltriethoxysilane (PhTEOS), a fluoroalkyltrimethoxysilane, a fluoroalkyltriethoxysilane, a chloroalkylmethoxysilane, a chloroalkylethoxysilane, an aminopropylthriethoxysilane, (3-glycidyloxypropyl) trimethoxysilane (GPTMOS), and mixtures thereof, preferably among tetramethoxysilane (TMOS), methyl trimethoxysilane (MTM), phenyltrimethoxysilane (PhTMOS), a fluoroalkyltrimethoxysilane, a chloroalkylmethoxysilane, an aminopropyltriethoxysilane (APTES), (3-glycidyloxypropyl) trimethoxysilane (GPTMOS), and mixtures thereof, more preferably among tetramethoxysilane (TMOS), methyl trimethoxysilane (MTM), trifluoropropyl trimethoxysilane (3FTMOS), 1H,1H,2H,2H perfluorodecyltriethoxysilane (13FTMOS), 1H,1H,2H,2H-perfluoroheptadecyltriethoxysilane (17FTMOS), aminopropyl triethoxysilane (APTES), phenyltrimethoxysilane (PhTMOS), (3-glycidyloxypropyl) trimethoxysilane (GPTMOS), and mixtures thereof. In one particular variant, the organosilicon precursor is selected among tetramethoxysilane (TMOS), tetraethoxysilane (TEOS), methyl trimethoxysilane (MTM), methyl triethoxysilane (MTE), phenyltrimethoxysilane (PhTMOS), phenyltriethoxysilane (PhTEOS), a fluoroalkyl trimethoxysilane, a fluoroalkylthriethoxysilane, an aminopropyltriethoxysilane, (3-glycidyloxypropyl) trimethoxysilane (GPTMOS), and mixtures thereof; preferably among tetramethoxysilane (TMOS), methyl trimethoxysilane (MTM), phenyltrimethoxysilane (PhTMOS), a fluoroalkyltrimethoxysilane, an aminopropyltrithoxysilane (APTES). (3-glycidyloxypropyl) trimethoxysilane (GPTMOS), and mixtures thereof: more preferably among tetramethoxysilane (TMOS), methyl trimethoxysilane (MTM), trifluoropropyl trimethoxysilane (3FTMOS), 1H,1H,2H,2H-perfluorodecyltriethoxysilane (13FTEOS), 1H,1H,2H,2H-perfluoroheptadecyltriethoxysilane (17FTEOS), aminopropyl triethoxysilane (APTES), phenyltrimethoxysilane (PhTMOS), (3-glycidyloxypropyl) trimethoxysilane (GPTMOS), and mixtures thereof.

In one embodiment, the organosilicon precursor is tetramethoxysilane. In another embodiment, the organosilicon precursor is a mixture of tetramethoxysilane with a precursor selected among methyl trimethoxysilane (MTM), methyl triethoxysilane (MTE), phenyltrimethoxysilane (PhTMOS), phenyltriethoxysilane (PhTEOS), a fluoroalkyltrimethoxysilane, a fluoroalkyl triethoxysilane, a chloroalkylmethoxy silane, a chloroalkylethoxysilane, an aminopropyltrimethoxysilane, (3-glycidyloxypropyl) trimethoxysilane (GPTMOS), and mixtures thereof, preferably among methyl trimethoxysilane (MTM), phenyltrimethoxysilane (PhTMOS), a fluoroalkyltrimethoxysilane, a chloroalkylmethoxysilane, an aminopropyltriethoxysilane, (3-glycidyloxypropyl) trimethoxysilane (GPTMOS), and mixtures thereof; preferably among methyl trimethoxysilane (MTM), trifluoropropyl trimethoxysilane (3FTMOS), 1H,1H,2H,2H-perfluorodecyltriethoxysilane (13FTMOS), 1H,1H,2H,2H-perfluoroheptadecyltriethocysilane (17FTMOS), aminopropyl triethoxysilane (APTES), phenyltrimethoxysilane (PhTMOS), (3-glycidyloxypropyl) trimethoxysilane (GPTMOS), and mixtures thereof. Alternatively, the mixture contains no chloroalkylmethoxysilane or chloroalkylethoxysilane. Preferred mixtures of organosilicon precursors include mixtures of tetramethoxysilane (TMOS) with methyl trimethoxysilane (MTM), with aminopropyl triethoxysilane (APTES), with trifluoropropyl trimethoxysilane (3FTMOS), with 1H,1H,2H,2H-perfluorodecyltrimethoxysilane (13FTMOS), with 1H,1H,2H,2H-perfluoroheptadecyl-trimethoxysilane (17FTMOS), with aminopropyl trumethoxysilane (APTMS)

and trifluoropropyl trimethoxysilane (3FTMOS), with aminopropyl triethoxy silane (APTES) and 1H,1H,2H,2H-perfluorodecyltriethoxysilane (13FTEOS), with aminopropyl triethoxysilane (APTES) and 1H,1H,2H,2H-perfluoroheptadecyltriethoxysilane (17FTOS), with phenyltrimethoxysilane (PhTMOS), with (3-glycidyloxypropyl)triethoxysilane (GPTEOS), with phenyltriethoxysilane (PhTEOS) and (3-glycidyloxypropyl trimethoxysilane (GPTMOS), and with 1H,1H,2H,2H-perfluoroheptadecyltriethoxy silane (17FTEOS) and (3-glycidyloxypropyl)trimethoxysilane (GPTMOS). Particularly good adhesion and filtration were obtained with a mixture of TMOS and (3-glycidyloxypropyl)trimethoxysilane (GPTMOS) and mixtures of TMOS and PhTMOS respectively.

When using a mixture of tetramethoxy silane and one or more organosilicon precursors, the molar proportions of tetramethoxysilane (TMOS)/other organosilicon precursors) can be varied between 100/0 and 50/50, preferably between 90/10 and 75/25.

The organosilicon precursor is advantageously 8 to 50% of the coating composition by volume, preferably 8 to 35%.

According to a first particular embodiment, the coating composition is directly applied to the textile material. This strategy directly uses the functionality of the organosilicon precursors used for the barrier function to adhere the sol-gel to the textile, in particular via hydroxyl functional groups on the surface.

According to a second particular embodiment, the method according to the invention comprises, before step b), a step of applying a precoating composition comprising an organic solvent and a zirconium alkoxide, said precoating composition containing no poly carboxylic acid. Due to the absence of polycarboxylic acid, the precoating composition according to the invention also does not require the presence of a catalyst for the formation of an acid anhydride intermediate from the polycarboxylic acid, for example phosphorus catalysts such as sodium hypophosphite. Thus, the precoating composition advantageously contains no such catalyst.

$Zr^{4+}$ has a high coordination number (+7) which facilitates adhesion to the textile material via complexation with the functional groups coming from the textile. Application of the coating composition in step b) covers this first adhesion layer to form the "barrier" coating. The zirconium alkoxide can be selected among tetra-n-propyl zirconate (CAS 23519-77-9), tetra-n-butyl zirconate (CAS 1071-76-7), tetra-iso-propyl zirconate (CAS 14717-56-7), tetra-tert-butyl zirconate (2081-12-1), bis(diethyl citrato)-dipropyl zirconate (CAS 308847-92-9), bis(2,2,6,6-tetramethyl-3,5-heptanedionate) di-iso-propyl zirconate (CAS 204522-78-1); preferably tetra-n-propyl zirconate (TPOZ) is chosen.

The textile material is impregnated by pad finishing with the coating composition. Pad finishing comprises a step of impregnating the textile material in sol followed by a step of squeezing under pressure which serves to eliminate the surplus sol. Compared to other coating techniques, such as dip coating, this technique provides a uniform sol distribution and better impregnation of sol into the fabric. Scanning electron microscopy images show that applying the coating composition according to the invention by pad finishing results in sheathing the textile fibers. Conversely, dip-coating results in a non-homogeneous deposition essentially on the surface, because it consists of dipping the textile material into the coating solution followed by elimination from the textile material while vertical. This elimination while vertical is inevitably accompanied by the formation of a deposition gradient that is thicker towards the bottom of the textile material. Moreover, simply dipping in the coating solution does not guarantee impregnation of the textile material and thus sheathing of the fibers. This sheathing of the fibers is important in imparting the desired properties to the textile material, however. Particularly good results in terms of fiber sheathing have been obtained with coating compositions having a dynamic viscosity less than or equal to 10 mPa·s (10 cP). Dynamic viscosity can be measured for example using a Physica MCR 301 rheometer available from Anton Paar, as described in the examples below.

Step b) of impregnating the textile material by pad finishing may be earned out once or repeated multiple times. The method according to the invention may in particular comprise 1 to 4 successive cycles of impregnating the textile material by pad finishing.

In one embodiment, the method according to the invention further comprises a step of immobilizing sol-gel pellets on at least one of the two sides of the textile material in order to increase the mass per unit area of sol-gel. The resulting impregnated textile material comprising sol-gel pellets has a mass per unit area of 60 to 500 $g/m^2$, preferably 80 to 400 $g/m^2$, and more preferably 100 to 300 $g/m^2$.

Preferably, the side of the impregnated textile material comprising the immobilized sol-gel pellets is covered by a second layer of textile material. This textile material may be identical to or different from the textile material used for the impregnation. Preferably the same type is used, more preferably the same material.

As indicated above, the side of the textile material comprising the immobilized pellets may be covered by a second layer of textile material. This second layer of textile material may in particular be applied after drying the impregnated textile material comprising the immobilized sol-gel pellets. Thus, in one aspect of this embodiment, the method according to the invention comprises, after the drying step c), the application of a second layer of textile material to the impregnated textile material comprising the immobilized sol-gel pellets. This second layer of textile material serves in particular as a protection to prevent immobilized pellets from falling off, for example after rubbing. The second layer of textile material may be secured to the impregnated textile material comprising the immobilized sol-gel pellets, in particular by stitching, welding, or gluing, for example with dots or lines of glue. Such stitching, welds (heat fusing), or dot or lines of glue may for example be applied to form containment areas. The skilled person will know how to choose the most suitable means for securing the textile materials together, according to the nature of the textile materials. Heat fusing, for example, is suitable for textile materials containing modacrylic fibers, alone or in combination, in particular with cotton, because they soften at about 140° C. and melt without burning and without flame transmission.

Immobilization of the sol-gel pellets may be carried out simultaneously with the impregnation with coating composition, or thereafter. Preferably, the step of immobilizing the sol-gel pellets is carried out after the drying step c). In this case, the pellets may for example be glued to at least one side, preferably on only one of the sides, of the textile material. Those skilled in the art w ill choose the glue according to the textile material used. Generally suitable adhesives include acrylic adhesives. The side on which the pellets have been adhered may be covered with a layer of textile material, for example non-woven, to improve retention of the sol-gel pellets. More specifically, the immobilization of the sol-gel pellets may be carried out by coating with an adhesive layer, in particular acrylic, one side of an impregnated textile material obtained from step c) of the method according to the invention, and then depositing a single layer of sol-gel pellets onto the glue-coated side by a hopper system with suction of the unglued pellets, and finally depositing a textile material, for example nonwoven, to improve retention of the sol-gel pellets. The pellets may also be immobilized without glue between two layers of textile material, of which at least one is a textile material obtained from step c) of the method according to the invention. For this, the two layers of textile material may be secured to each other by any suitable means, such as stitching, welding (heat fusing), or gluing, for example in the form of dots or lines of glue, but also by applying the adhesive over the entire surface concerned. In one particular aspect, the sol-gel pellets are immobilized between two layers of textile material, of which at least one is a textile material obtained from step c) of the method of the invention, within containment areas defined by swelling, welding (heat fusing), or gluing. The skilled person will choose the most suitable manner for defining containment areas, according to the nature of the textile materials.

The sol-gel pellets may be prepared from the same organosilicon precursors or precursor combinations as the sol-gel material which impregnates the textile material. Thus, the organosilicon precursors and precursor combinations mentioned above in relation to the coating composition can also be used for the preparation of sol-gel pellets. These pellets may be prepared according to preparation methods known to those skilled in the art. As examples for the synthesis of sol-gel pellets, we can cite the synthesis of porous discs for trapping monocyclic hydrocarbons and their optical detection (Benzene and xylene detection by absorbance in the range of 10-100 ppb. Application: Quality of indoor air, J. Hue, M. Dupoy. T. Bordy. R. Rousier, S. Vignoud, B. Schaerer, T-H Tran-Thi, C. Rivron, L. Mugherli, P. Karpe, Sensors & Actuators B, 189 (2013) 194-198, http://dx.doi.org/10.1016/j.snb.2013.03.047).

In one embodiment, the textile material used in step b) of the method according to the invention is dried prior to impregnation with the coating composition, in order to remove surface water. This drying is particularly advantageous in the case of textile materials incorporating cellulose fibers such as cotton or viscose. The skilled person will adjust the drying temperature and duration to the textile material and the water content, in particular at the surface. Advantageously, the textile material is dried at a temperature of 80 to 180° C. preferably 100 to 150° C., more preferably about 120° C. The drying time is advantageously several minutes, for example 2 to 10 minutes, in particular from 2 to 5 minutes.

Another object of the invention is the coating composition as described above.

The invention also relates to an impregnated textile material obtainable by the coating method according to the invention described above. It therefore concerns a textile material impregnated with a sol-gel material. All the details and embodiments described above concerning the nature of the textile material and the sol-gel material also apply to the impregnated textile material according to the invention. The impregnated textile material according to the invention is in particular characterized in that it has a specific surface area $S_{BET}$ (determined from adsorption isotherms using the Brunauer, Emmet and Teller (BET) model) between 330±30 and 880±30 $m^2 \cdot g^{-1}$, in particular between 540±30 and 880±30 $m^2 \cdot g^{-1}$. The proportion of micropores (<20 Å) is preferably greater than 0%, preferably greater than 0.30%, and even more preferably greater than 50%. The proportion of mesopores (20 Å-500 Å) is preferably less than 70%, and more preferably less than 50%. The textile material preferably has no macropores (>500 Å). The mass per unit area of the sol-gel material may vary from 1 to 500 $g/m^2$, preferably from 5 to 400 $g/m^2$, more preferably from 10 to 300 $g/m^2$.

When the impregnated textile material according to the invention further comprises sol-gel pellets immobilized on at least one of its sides as described above, it advantageously has a mass per unit area of 60 to 500 $g/m^2$, preferably 80 to 400 $g/m^2$, and more preferably 100 to 300 $g/m^2$. When the impregnated textile material according to the invention does not comprise immobilized sol-gel pellets, it advantageously has a mass per unit area of 60 $g/m^2$ of deposition, preferably 5 to 50 $g/m^2$, and more preferably 10 to 40 $g/m^2$.

The impregnated textile material according to the invention finds particular applications in gas filtration, especially for personal protective equipment such as clothing, in particular to protect against toxic chemicals, but also for textiles intended to protect the respiratory tract (masks), textiles that absorb unwanted odors such as frying or tobacco, for example such as consumable filters. The intention therefore also relates to a filter, in particular a gas filter, comprising the textile material of the invention.

A particular object of the invention relates to personal protective equipment comprising the textile material according to the invention. This personal protective equipment may for example be a full body suit, pants, a jacket, gloves, hoods, socks, masks. With the functional properties of the textile material according to the invention, particularly the filtration of polar and apolar toxic gases, the personal protective equipment is particularly suitable for NBC hazards (nuclear, bacteriological, and chemical). Thus, in one embodiment, the personal protective equipment is NBC personal protective equipment.

Non-limiting embodiments of the invention are described below.

FIGURES

FIG. 1: Comparison of normalized methyl salicylate breakthrough curves with a deposition of 20 $g/m^2$ for the original fabric, formula H (strategy I), formula H' (strategy II), and formula H" (strategy III). Also illustrates the measurement of $t_{1/2}$ for sample H" where $T_{max}$ is the final methyl salicylate content and $t_{1/2}$ is the total trapping period having $T_{max}/2$ as the ordinate.

Figure 2:
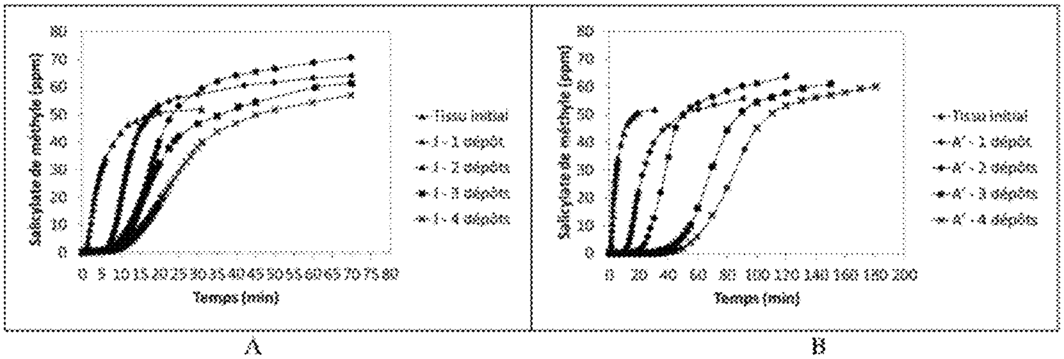

FIG. 2: (A) Comparison of normalized methyl salicylate breakthrough curves with successive depositions of 20 $g/m^2$ for the original fabric and formula J (strategy I); (B) Comparison of normalized methyl salicylate breakthrough curves with successive depositions of 20 $g/m^2$ for the original fabric and formula A' (strategy II).

Figure 3:
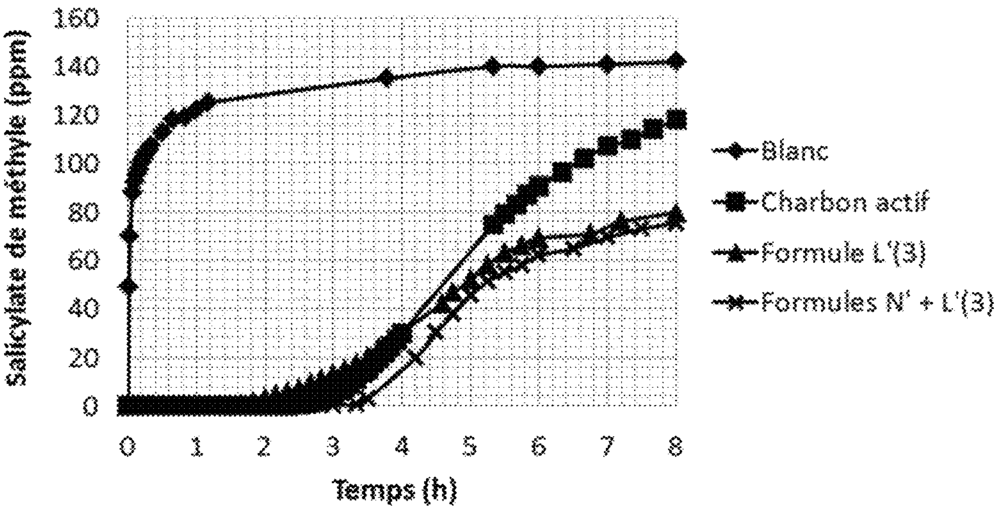

FIG. 3: Comparison of methyl salicylate breakthrough curves obtained with activated carbon, formula L'❷, and formulas N'+L'❸.

Figure 4:
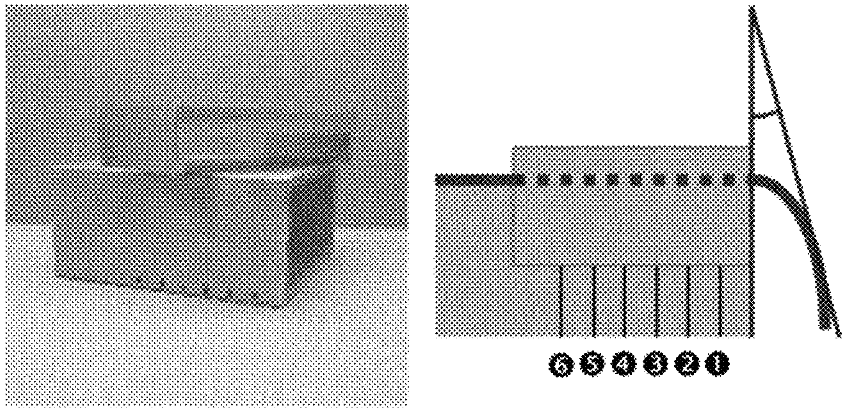

FIG. 4: (A) Schematic view of the components of the tool for measuring the drape of the fabric; (B) Schematic diagram of measuring the drape of the fabric.

Figure 5:
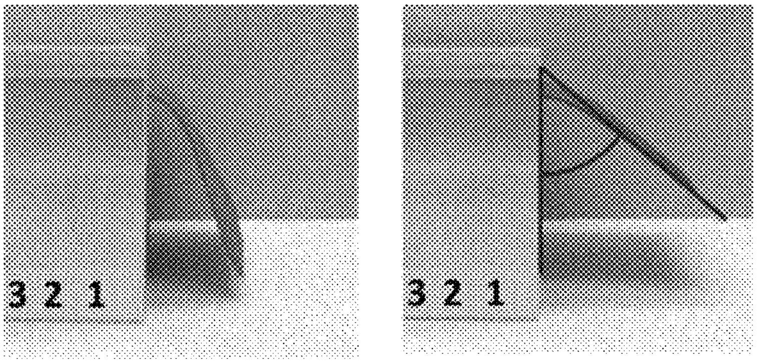

FIG. 5: (A) Photo of the original fabric in the tool for measuring the drape of the fabric; (B) photo of the fabric impregnated with formulation K'.

Figure 6:
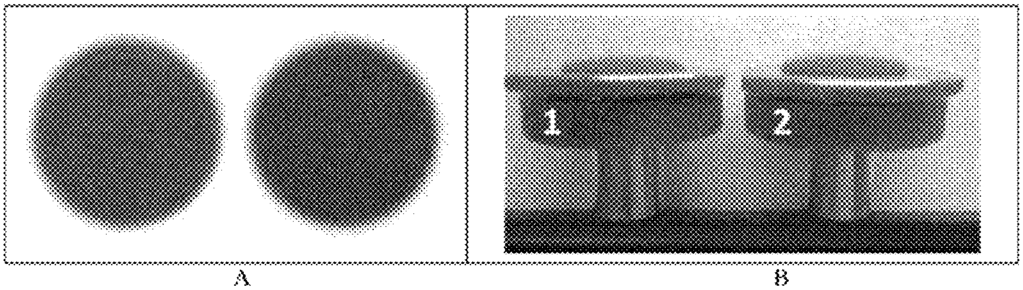

FIG. 6: (A) Photo from top view: fabric+A' sol-gel (left)/fabric (right): (B) Photo from side view: fabric+A' sol-gel (left)/fabric (right).

Figure 7:
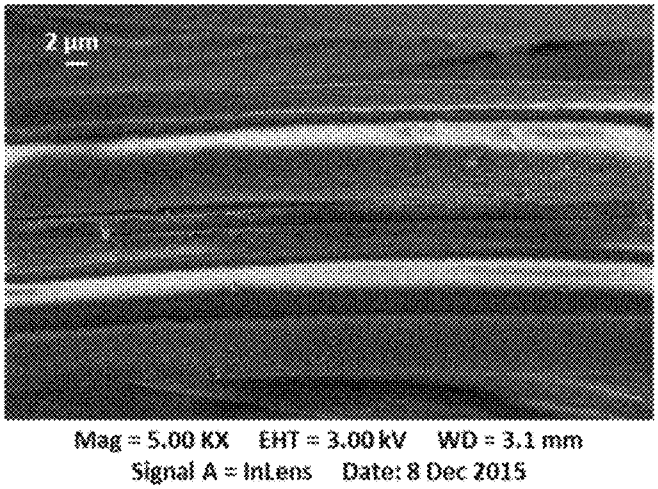

FIG. 7: Top view using SEM (scanning electron microscopy) of the deposition of formulation A'.

Figure 8:
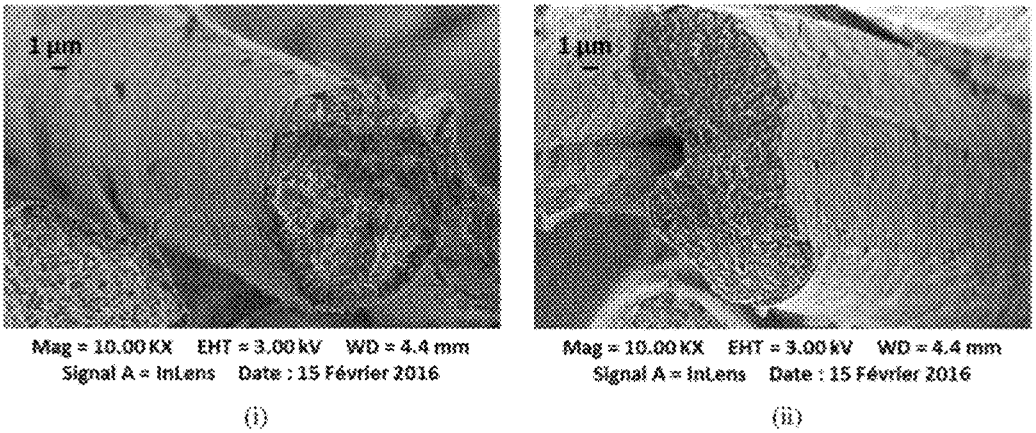

FIG. 8: Cross-sectional view using SEM of the deposition of formulation A'.

Figure 9:
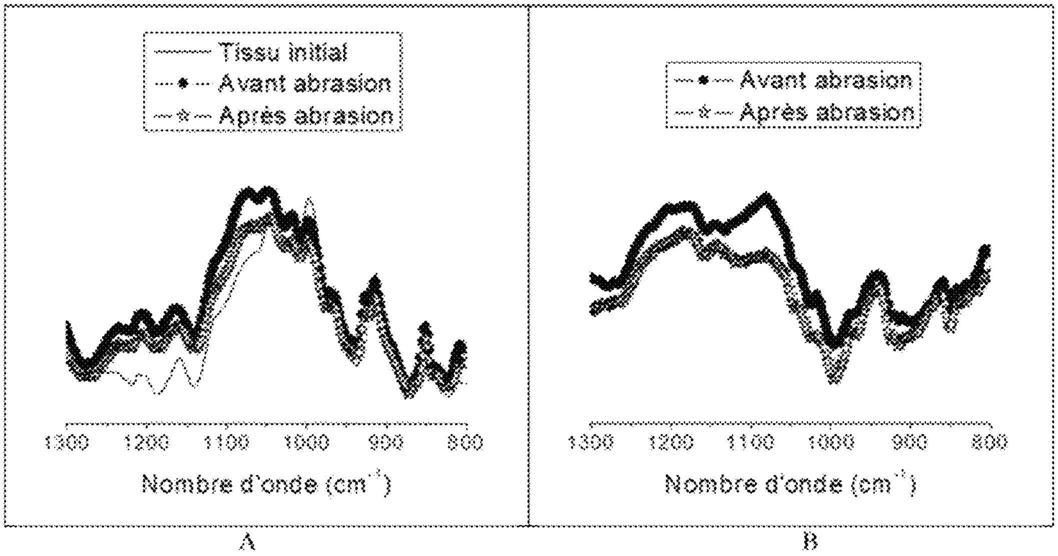

FIG. 9: (A) unprocessed IR spectrum: original fabric, fabric+A' sol-gel before abrasion, fabric+A' sol-gel after abrasion; (B) differential IR spectrum: A' sol-gel before abrasion, A' sol-gel after abrasion.

Figure 10:
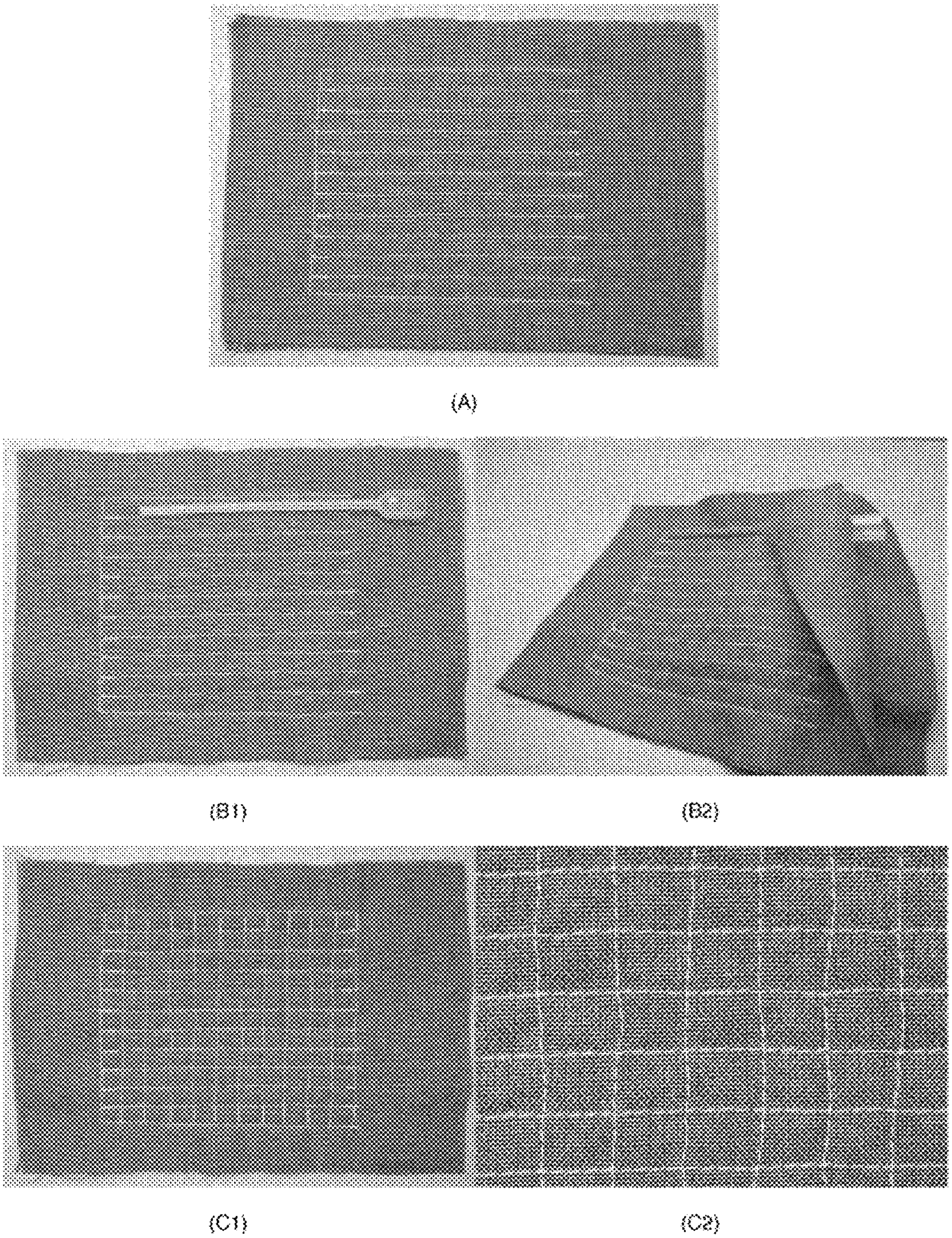

FIG. 10: Illustration of the immobilization of sol-gel pellets in Example 5: (A) photo of the textile material used for the immobilization process: two layers sewn together on which lines have been defined, (B1) and (B2) system used to introduce the pellets within the lines defined by stitching, using a cut pipette, (C1) and (C2) textile material obtained by immobilization method: seams defining containment areas.

Figure 11:
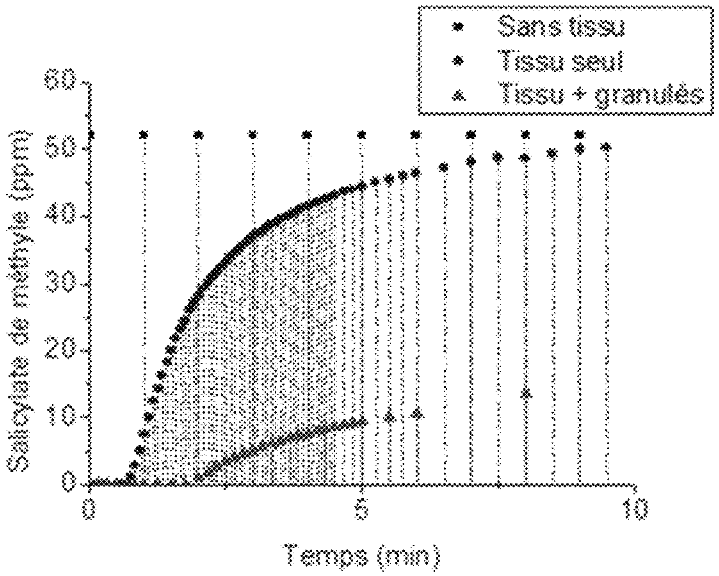

FIG. 11: Graphs of the results of filtration tests with the methyl salicylate of Example 5 over 10 minutes.

Figure 12:
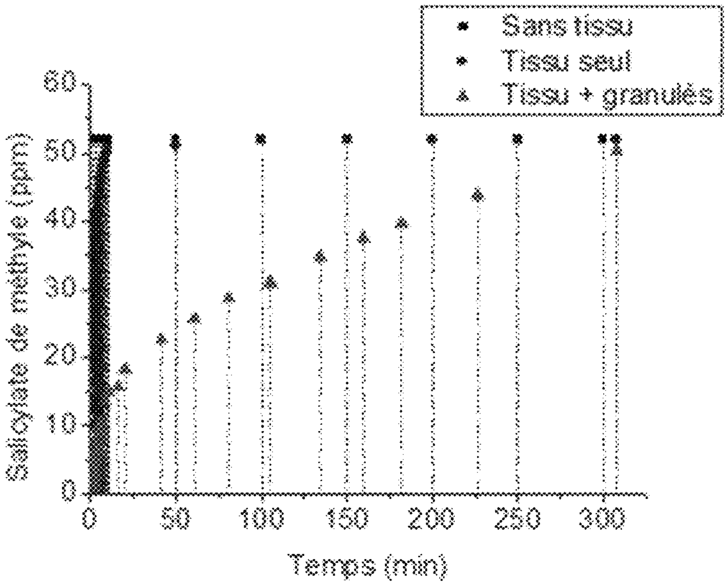

FIG. 12: Graphs of the results of filtration tests with the methyl salicylate of Example 5 over 300 minutes.

EXAMPLES

Chemicals Used

- Tetramethoxysilane (CAS: 681-84-5) (TMOS, Acres Organics, 99%);
- Tetraethoxysilane (CAS 78-10-4) (TEOS, Acres Organics, 98%); Methyl trimethoxysilane (CAS 1185-55-3) (MTM, Sigma-Aldrich, 98%);
- Trifluoropropyl trimethoxysilane (CAS: 429-60-7) (3FTMOS, TCI, >98%);
- 1H,1H,2H,2H-Perfluorodecyltriethoxysilane (CAS 51851-37-7) (13FTEOS, Sigma-Aldrich, 98%);
- 1H,1H,2H,2H-Perfluoroheptadecyltriethoxysilane (CAS: 101947-16-4) (17FTEOS, Sigma-Aldrich, 97%);
- Aminopropyl triethoxysilane (CAS: 919-30-2) (APTES, Acros Organics, 99%);
- Phenyl trimethoxysilane (CAS: 2996-92-1) (PhTMOS, TCI, >98%).
- Phenyl triethoxy silane (CAS: 780-69-8) (PhTEOS, Sigma-Aldrich, ≥Sigma-Aldrich);
- (3-glycidyloxypropyl)trimethoxysilane (CAS: 2530-83-8) (GPTMOS, Sigma-Aldrich, ≥98%);
- Tetrapropyl zirconate 70% $_{wt}$ in 1-propanol (CAS: 23519-77-9) (TPOZ. Sigma-Aldrich);
- Bis(diethyl citrato)-dipropyl zirconate (CAS: 308847-92-9) (DPOZ, Sigma-Aldrich);
- Ethanol (CAS: 64-17-5) (Merck, Uvasol for spectroscopy);
- Acetonitrile (CAS: 75-05-8) (Merck, Lichrosolv gradient grade for liquid chromatography);
- Succinic acid (CAS: 110-15-6) (Sigma-Aldrich, Reagent Plus≥99.0%);
- Sodium hypophosphite (CAS: 123333-67-5) (Sigma-Aldrich, hydrate).

Measurement of Dynamic Viscosity

The dynamic viscosity of the various formulations of Example 1 was measured with a Physica MCR 301 rheometer available from Anton Paar.

The analysis volume is 700 μL deposited without deburring on a support heat controlled to 20° C. The viscosity is measured with a cone-plate in constant shear rotation (γ=100 s−1). The measurement method used generates 20 viscosity points 20 seconds apart. Each viscosity measurement therefore corresponds to an average of 20 points. The measurements are expressed in Pa·s.

Example 1: Preparation of Coated Fabrics

I. Preparation of Coated Fabrics According to the Strategy Described in FR 2984343 A1 (with Polybasic Carboxylic Acid and Catalyst)

Formulations A to K described below are deposited on pieces of 5 cm×10 cm to 21 cm×30 cm of 50:50 Kermel®/Lenzing FR® fabric (Kernel, Colmar, France; Lenzing AG, Lenzing, Austria) by bath impregnation and squeezing (principle of pad finishing), then the fabrics are dried in an oven for 2 min at 120° C. and allowed to stand 24 h at room temperature and atmospheric pressure in the laboratory. In another embodiment, the textile material is nonwoven, in particular a felt. An example of such a felt is the one from Duflot Industries in Nomex®.

The initial amount deposited varies between 15 and 31 g/m$^2$. The mass per unit area of the sol-gel material is derived by weighing the fabric before and after impregnation.

Formulation A

In a hermetically scalable glass flask, 0.164 g succinic acid and 0.174 g sodium hypophosphite are mixed in a volume of 22.13 mL ultrapure water. The mixture is stirred at room temperature (20-22° C.) until dissolution of the poly acid and catalyst at setting 4 of the IKA WERKE RO10 Power multistirrer plate (about 500 rpm). Then 2.873 mL TMOS are added to the initial mixture.

Dynamic viscosity: 2.1 cP (mPa·s)

Deposition of this formula on textile indicates a mass per unit area of 24 g/m$^2$.

Formulation B

In a hermetically scalable glass flask, 0.164 g succinic acid and 0.175 g sodium hypophosphite are mixed in a volume of 22.15 mL ultrapure water. The mixture is stirred at room temperature (20-22° C.) until dissolution of the poly acid and catalyst at setting 4 of the IKA WERKE RO10 Power multistirrer plate (about 500 rpm). Then 1.438 mL TMOS and 1.415 mL MTM are added to the initial mixture.

Dynamic viscosity: 2.0 cP (mPa·s)

Deposition of this formula on textile indicates a mass per unit area of 18 g/m$^2$.

Formulation C

In a hermetically sealable glass flask, 0.164 g succinic acid and 0.174 g sodium hypophosphite are mixed in a volume of 22.14 mL ultrapure water. The mixture is stirred at room temperature (20-22° C.) until dissolution of the polyacid and catalyst at setting 4 of the IKA WERKE RO10 Power multistirrer plate (about 500 rpm). Then 2.012 mL TMOS and 0.848 mL MTM are added to the initial mixture.

Dynamic viscosity: 1.7 cP (mPa·s)

Deposition of this formula on textile indicates a mass per unit area of 18 g/m$^2$.

Formulation D

In a hermetically sealable glass flask, 0.111 g succinic acid and 0.119 g sodium hypophosphite are mixed in 11.51 mL ultrapure water and 11.51 mL ethanol. The mixture is stirred at room temperature (20-22° C.) until dissolution of the polyacid and catalyst at setting 4 of the IKA WERKE RO10 Power multistirrer plate (about 500 rpm). Then 1.896 mL TMOS and 0.085 mL APTES are added to the initial mixture Dynamic viscosity: 19.6 cP (mPa·s)

Deposition of this formula on textile indicates a mass per unit area of 31 g/m$^2$.

Formulation E

In a hermetically sealable glass flask, 0.111 g succinic acid and 0.119 g sodium hypophosphite are mixed in 11.50 mL ultrapure water and 11.50 mL ethanol. The mixture is stirred at room temperature (20-22° C.) until dissolution of the polyacid and catalyst at setting 4 of the IKA WERKE RO10 Power multistirrer plate (about 500 rpm). Then 1.836 mL TMOS and 0.170 mL APTES are added to the initial mixture.

Dynamic viscosity: 65 cP (mPa·s)

Deposition of this formula on textile indicates a mass per unit area of 25 g/m$^2$.

Formulation F

In a hermetically scalable glass flask, 0.151 g succinic acid and 0.161 g sodium hypophosphite are mixed in 19.40 mL ultrapure water and 2.91 mL acetonitrile. The mixture is stirred at room temperature (20-22° C.) until dissolution of the polyacid and catalyst at setting 4 of the IKA WERKE RO10 Power multistirrer plate (about 500 rpm). Then 2.516 mL TMOS and 0.175 mL 3FTMOS are added to the initial mixture.

Dynamic viscosity: 2.1 cP (mPa·s)

Deposition of this formula on textile indicates a mass per unit area of 15 g/m$^2$.

Formulation G

In a hermetically sealable glass flask, 0.150 g succinic acid and 0.160 g sodium hypophosphite are mixed in 19.26 mL ultrapure water and 2.89 mL acetonitrile. The mixture is stirred at room temperature (20-22° C.) until dissolution of the polyacid and catalyst at setting 4 of the IKA WERKE RO10 Power multistirrer plate (about 500 rpm). Then 2.499 mL TMOS and 0.348 mL 13FTEOS are added to the initial mixture.

Dynamic viscosity: 2.2 cP (mPa·s)

Deposition of this formula on textile indicates a mass per unit area of 16 g/m$^2$.

Formulation H

In a hermetically sealable glass flask, 0.149 g succinic acid and 0.159 g sodium hypophosphite are mixed in 19.13 mL ultrapure water and 2.87 mL acetonitrile. The mixture is stirred at room temperature (20-22° C.) until dissolution of the polyacid and catalyst at setting 4 of the IKA WERKE RO10 Power multistirrer plate (about 500 rpm). Then 2.481 mL TMOS and 0.524 mL 17FTEOS are added to the initial mixture.

Dynamic viscosity: 4.8 cP (mPa·s)

Deposition of this formula on textile indicates a mass per unit area of 19 g/m$^2$.

Formulation I

In a hermetically sealable glass flask, 0.111 g succinic acid and 0.118 g sodium hypophosphite are mixed in 11.49 mL ultrapure water and 11.49 mL ethanol. The mixture is stirred at room temperature (20-22° C.) until dissolution of the poly acid and catalyst at setting 4 of the IKA WERKE RO10 Power multistirrer plate (about 500 rpm). Then 1.7% mL TMOS, 0.129 mL 3FTMOS, and 0.095 mL APTES are added to the initial mixture.

Dynamic viscosity: 3.6 cP (mPa·s)

Deposition of this formula on textile indicates a mass per unit area of 23 g/m$^2$.

Formulation J

In a hermetically scalable glass flask, 0.111 g succinic acid and 0.118 g sodium hypophosphite are mixed in 11.43 mL ultrapure water and 11.43 mL ethanol. The mixture is stirred at room temperature (20-22° C.) until dissolution of the poly acid and catalyst at setting 4 of the IKA WERKE RO10 Power multistirrer plate (about 500 rpm). Then 1.787 mL TMOS, 0.257 mL 13FTEOS, and 0.094 mL APTES are added to the initial mixture.

Dynamic viscosity: 3.7 cP (mPa·s)

Deposition of this formula on textile indicates a mass per unit area of 23 g/m$^2$.

Formulation K

In a hermetically scalable glass flask, 0.111 g succinic acid and 0.118 g sodium hypophosphite are mixed in 11.41 mL ultrapure water and 11.41 mL ethanol. The mixture is stirred at room temperature (20-22° C.) until dissolution of the polyacid and catalyst at setting 4 of the IKA WERKE RO10 Power multistirrer plate (about 500 rpm). Then 1.784 mL TMOS, 0.294 mL 17FTEOS, and 0.094 mL APTES are added to the initial mixture.

Dynamic viscosity: 18 cP (mPa·s)

Deposition of this formula on textile indicates a mass per unit area of 21 g/m$^2$.

II. Preparation of Coated Fabrics According to the Invention (without Polybasic Carboxylic Acid and without Catalyst) in One Step Formulation A'

In a hermetically sealable glass flask, 2.873 mL TMOS are added to a volume of 22.13 mL ultrapure water. The formula is stirred at room temperature (20-22° C.) at setting 4 of the IKA WERKE RO10 Power multistirrer plate (about 500 rpm).

Dynamic viscosity: 6.8 cP (mPa·s)

Deposition of this formula on textile indicates a mass per unit area of 29 g/m$^2$.

Formulation B'

In a hermetically sealable glass flask, 1.438 mL TMOS and 1.415 mL MTM are added to a volume of 22.15 mL ultrapure water. The formula is stirred at room temperature (20-22° C.) at setting 4 of the IKA WERKE RO10 Power multistirrer plate (about 500 rpm).

Dynamic viscosity: 2.3 cP (mPa·s)

Deposition of this formula on textile indicates a mass per unit area of 27 g/m$^2$.

Formulation C'

In a hermetically sealable glass flask, 2.012 mL TMOS and 0.848 mL MTM are added to a volume of 22.14 mL ultrapure water. The formula is stirred at room temperature (20-22° C.) at setting 4 of the IKA WERKE RO10 Power multistirrer plate (about 500 rpm).

Dynamic viscosity: 2.4 cP (mPa·s)

Deposition of this formula on textile indicates a mass per unit area of 27 g/m$^2$.

Formulation D'

In a hermetically sealable glass flask, 1.896 mL TMOS and 0.085 mL APTES are added to a mixture of 11.51 mL ultrapure water and 11.51 mL ethanol. The formula is stirred at room temperature (20-22° C.) at setting 4 of the IKA WERKE RO10 Power multistirrer plate (about 500 rpm).

Dynamic viscosity: 3.4 cP (mPa·s)

Deposition of this formula on textile indicates a mass per unit area of 27 g/m$^2$.

Formulation E'

In a hermetically sealable glass flask, 1.836 mL TMOS and 0.170 mL APTES are added to a mixture of 11.50 mL ultrapure water and 11.50 mL ethanol. The formula is stirred at room temperature (20-22° C.) at setting 4 of the IKA WERKE RO10 Power multistirrer plate (about 500 rpm).

Dynamic viscosity: 3.8 cP (mPa·s)

Deposition of this formula on textile indicates a mass per unit area of 24 g/m$^2$.

Formulation F'

In a hermetically sealable glass flask, 2.516 mL TMOS and 0.175 mL 3FTMOS are added to a mixture of 19.40 mL ultrapure water and 2.91 mL acetonitrile. The formula is stirred at room temperature (20-22° C.) at setting 4 of the IKA WERKE RO10 Power multistirrer plate (about 500 rpm).

Dynamic viscosity: 2.7 cP (mPa·s)

Deposition of this formula on textile indicates a mass per unit area of 23 g/m$^2$.

Formulation G'

In a hermetically sealable glass flask, 2.499 mL TMOS and 0.348 mL 13FTEOS are added to a mixture of 19.26 mL ultrapure water and 2.89 mL acetonitrile. The formula is stirred at room temperature (20-22° C.) at setting 4 of the IKA WERKE RO10 Power multistirrer plate (about 500 rmp).

Dynamic viscosity: 3.6 cP (mPa·s)

Deposition of this formula on textile indicates a mass per unit area of 21 g/m$^2$.

Formulation H'

In a hermetically sealable glass flask, 2.481 mL TMOS and 0.524 mL 17FTEOS are added to a mixture of 19.13 mL ultrapure water and 2.87 mL acetonitrile. The formula is stirred at room temperature (20-22° C.) at setting 4 of the IKA WERKE RO10 Power multistirrer plate (about 500 rpm).

Dynamic viscosity: 3.7 cps (mPa·s)

Deposition of this formula on textile indicates a mass per unit area of 23 g/m$^2$.

Formulation I'

In a hermetically sealable glass flask, 11.49 mL ultrapure water and 11.49 mL ethanol are mixed. Then 1.7% mL TMOS, 0.129 mL 3FTMOS, and 0.095 mL APTES are added to the solvent mixture. The formula is stirred at room temperature (20-22° C.) at setting 4 of the IKA WERKE RO10 Power multistirrer plate (about 500 rpm).

Dynamic viscosity: 3.4 cP (mPa·s)

Deposition of this formula on textile indicates a mass per unit area of 21 g/m$^2$.

Formulation J'

In a hermetically sealable glass flask, 11.43 mL ultrapure water and 11.43 mL ethanol are mixed. Then 1.787 mL TMOS, 0.257 mL 13FTEOS, and 0.094 mL APTES are added to the solvent mixture. The formula is stirred at room temperature (20-22° C.) at setting 4 of the IKA WERKE RO10 Power multistirrer plate (about 500 rpm).

Dynamic viscosity: 3.5 cP (mPa·s)

Deposition of this formula on textile indicates a mass per unit area of 21 g/m$^2$.

Formulation K'

In a hermetically sealable glass flask, 11.41 mL ultrapure water and 11.41 mL ethanol are mixed. Then 1.784 mL TMOS, 0.294 mL 17FTEOS, and 0.094 mL APTES are added to the solvent mixture. The formula is stirred at room temperature (20-22° C.) at setting 4 of the IKA WERKE RO10 Power multistirrer plate (about 500 rpm).

Dynamic viscosity: 3.9 cP (mPa·s)

Deposition of this formula on textile indicates a mass per unit area of 22 g/m$^2$.

Formulation L' (L'❶, L'❷, and L'❸)

In a hermetically scalable glass flask, 4.900 mL TMOS and 0.683 mL PhTMOS are added to a volume of 40.88 mL ultrapure water (formulation L'❶) or to a mixture of 20.44 mL ultrapure water and 20.44 mL ethanol (formula L'❷). In a hermetically sealable glass flask, 57.26 mL TMOS and 13.01 mL PhTMOS are added to a volume of 129.72 mL ultrapure water (formula L'❸). The formulas are stirred at room temperature (20-22° C.) at setting 4 of the IKA WERKE RO10 Power multistirrer plate (about 500 rpm).

Deposition of formulas L'❶, L'❷ on textile respectively indicate a mass per unit area of 16 and 17 g/m$^2$. Deposition of formula L'❸ on a Nomex® felt indicates a mass per unit area of 510 g/m$^2$.

Formulation M'

In a hermetically sealable glass flask, 1.000 mL TMOS and 0.418 mL PhTMOS are added to a volume of 10.010 mL ultrapure water. The formula is stirred at room temperature (20-22° C.) at setting 4 of the IKA WERKE RO10 Power multistirrer plate (about 500 rpm).

Dynamic viscosity: 1.7 cP (mPa·s)

Deposition of this formula on textile indicates a mass per unit area of 18 g/m$^2$.

Formulation N'

In a hermetically sealable glass flask, 4.000 mL TMOS and 0.660 mL GPTMS are added to a volume of 33.37 mL ultrapure water. The formula is stirred at room temperature (20-22° C.) at setting 4 of the IKA WERKE RO10 Power multistirrer plate (about 500 rpm).

Dynamic viscosity: 4.7 cP (mPa·s)

Deposition of this formula on textile indicates a mass per unit area of 13 g/m$^2$.

Formulation O'

In a hermetically scalable glass flask, 2.277 mL TMOS, 0.367 mL PhTMOS, and 0.434 mL GPTMOS are added to a volume of 21.93 mL ultrapure water. The formula is stirred at room temperature (20-22° C.) at setting 4 of the IKA WERKE RO10 Power multistirrer plate (about 500 rpm).

Dynamic viscosity: 1.9 cP (mPa·s)

Deposition of this formula on textile indicates a mass per unit area of 17 g/m$^2$.

Formulation P'

In a hermetically sealable glass flask, 2.158 mL TMOS, 0.552 mL 17FTEOS, and 0.3% mL GPTMOS are added to a mixture of 19.04 mL ultrapure water and 2.86 mL acetonitrile. The formula is stirred at room temperature (20-22° C.) at setting 4 of the IKA WERKE RO10 Power multistirrer plate (about 500 rpm).

Dynamic viscosity: 3.9 cP (mPa·s)

Deposition of this formula on textile indicates a mass per unit area of 15 g/m$^2$.

III. Preparation of Coated Fabrics According to the Invention (without Polybasic Carboxylic Acid and without Catalyst) in Two Steps Formulation H"

In a first hermetically sealable glass flask, 2.00 mL TPOZ are diluted in 23.0 mL ethanol (formula H'1). In a second hermetically sealable glass flask, 19.13 mL ultrapure water and 2.87 mL acetonitrile are mixed. Then 2.481 mL TMOS and 0.524 mL 17FTEOS are added to the solvent mixture (formula H"2). The formulas are stirred at room temperature (20-22° C.) at setting 4 of the IKA WERKE RO10 Power multistirrer plate (about 500 rpm).

Dynamic Viscosity:

H"1: 1.5 cP (mPa·s)

H"2: 2.6 cP (mPa·s)

Successive depositions of formulas H"1 and H"2 on textile indicate a mass per unit area of 14 g/m$^2$.

Formulation L"

In a first hermetically scalable glass flask, 11.28 mL TPOZ are diluted in % 82 mL ethanol (formula L"1). In a second hermetically sealable glass flask, 16.415 mL TMOS and 2.290 mL PhTMOS are added to a volume of 137.0 mL ultrapure water (formula L"2). The formulas are stirred at room temperature (26-27° C.) at about three increments of the BIBBY HG 1202 hotplate magnetic stirrer (about 400 rpm).

Sequenced depositions of formulas L"1 and L"2 (=L") on textile indicate a mass per unit area of 10 g/m$^2$.

Formulation M"

In a first hermetically sealable glass flask, 2.76 mL TPOZ are diluted in 22.2 mL ethanol (formula M"1). In a second hermetically sealable glass flask, 8.55 mL TMOS and 3.67 mL PhTMOS are mixed with 87.8 mL ultrapure water (formulation M"2). The formulations are stirred at room temperature (20-22° C.) at setting 4 of the IKA WERKE RO10 Power multistirrer plate (about 500 rpm)

Dynamic Viscosity:

M"1: 1.5 cP (cps)

M"2:1.9 cP (mPa·s)

Successive depositions of formulas M"1 and M"2 on textile indicate a mass per unit area of 20 g/m$^2$. Sequenced deposits of formulas M"1 and M"2 on textile indicate a mass per unit area of 17 g/m$^2$.

Table 1 below summarizes the weights per unit area obtained for different formulations Recall that:

- Adhesion strategy I according to FR 2984343 A1 is carried out with the addition of succinic acid and sodium hypophosphite;
- One-step adhesion strategy II according to the invention is direct adhesion with the silica precursors used;
- Two-step adhesion strategy III according to the invention is adhesion via a Zr alkoxide.

TABLE 1

| Sol-gel precursors | Formula according to strategy I | Deposit. of sol-gel (g/m$^2$) | Formula according to strategy II | Deposit. of sol-gel (g/m$^2$) | Formula according to strategy III | Deposit of sol-gel (g/m$^2$) |
|---|---|---|---|---|---|---|
| TMOS | A | 24 | A' | 29 | — | — |
| TMOS/MTM | B | 18 | B' | 27 | — | — |
| TMOS-MTM | C | 18 | C' | 77 | — | — |
| TMOS/APTES | D | 31 | D' | 27 | — | — |
| TMOS/APTES | E | 75 | E' | 24 | — | — |
| TMOS/3FTMOS | F | 15 | F' | 73 | — | — |
| TMOS/13FTEOS | G | 16 | G' | 21 | — | — |
| TMOS/17FTEOS | H | 19 | H' | 23 | H" | 14 |
| TMOS/APTES/3FTMOS | I | 23 | I' | 21 | — | — |
| TMOS/APTES/13FTEOS | J | 23 | J' | 74 | — | — |
| TMOS/APTES/17FTEOS | K | 21 | K' | 77 | — | — |
| TMOS/PhTMOS | — | — | L'❶ | 16 | L" = L"❶ + L"❷ | 10 |
| TMOS/PhTMOS | — | — | L'❷ | 17 | — | — |
| TMOS/PhTMOS | — | — | M' | 18 | M"❶ | 20 |
| TMOS/PhTMOS | — | — | — | — | M"❷ | 17 |
| TMOS/GPTMOS | — | — | N' | 13 | — | — |
| TMOS/GPTMOS/PhTMOS | — | — | O' | 17 | — | — |
| TMOS/GPTMOS/17FTEOS | — | — | P' | 15 | — | — |

Example 2: Exposure to Pollutants

Fabrics impregnated with each sol-gel formulation were exposed to gas mixtures containing toluene or methyl salicylate, in order to test trapping efficiency versus the porosity properties of the sol-gel materials and the intrapore polarity. The breakthrough curves under gas flow were established for each pollutant.

2.1 Materials and Methods

Gas Permeability of Fabrics

To test the gas permeability of the fabrics, a test bench was installed in the laboratory. For this purpose, a Quantachrome Porometer 3G with 37 mm sample holder was used. The Porometer can test fabric 37 mm in diameter (cut out with a punch). The seal is provided by O-rings. The flow of gas thus passes through the entire fabric tested.

The fabric test bench consists of two 4-way valves, upstream and downstream of the sample holder, which make it possible to measure gas flow's upstream and downstream of the sample holder. Tests showed that there is no (or little) pressure drop when the tested fabric is present. The pollutant content is measured in the flow of gas upstream and downstream of the sample holder, using a PID (Photoionization Detector) to obtain the pollutant breakthrough curve. Fabric permeability is tested using two pollutants: toluene and/or methyl salicylate. Each pollutant has its own specific exposure conditions. These conditions are described below.

Toluene Permeability Test:

For the toluene exposure tests, the pollutant is obtained from a cylinder calibrated for 100 ppm (the flow range of the flow meter used is within 0-100 mL/min) then diluted in dry nitrogen (the flow range of the flow meter used is within 0-1 L/min). The flow of diluted gas is brought into contact with the tested fabric. A toluene content of 3-4 ppm is conventionally used for permeability tests.

Methyl Salicylate Permeability Test:

For the methyl salicylate exposure tests, the vapor of this pollutant is generated by bubbling dry nitrogen (the flow range of the flow meter used is within 0-1 L/min). The flow of gas enriched with methyl salicylate is brought into contact with the tested fabric. A thermostat/cryostat to regulate the temperature of the bubbler containing the methyl salicylate (coil) is used to ensure reproducibility of the exposure tests. The bubbler containing the methyl salicylate is thus kept at 20° C. Using a dry nitrogen flow rate of 300 mL/min. an initial content of 55-00 ppm of methyl salicylate is obtained.

Methods for Processing Methyl Salicylate Permeability Data

The methyl salicylate permeability tests consist of measuring the salicylate content (ppm) over time. This tracing is called a breakthrough curve, for which the "S" shape is more or less pronounced. The comparison of normalized methyl salicylate breakthrough curves with a deposition of 20 g/m$^2$ for the original fabric, formula H (strategy I), formula H' (strategy II), and formula H" (strategy III) is shown in FIG. 1. The comparison of normalized methyl salicylate breakthrough curves with successive depositions of 20 g/m$^2$ for the original fabric and formula J (strategy I) and for the original fabric and formula A' are shown in FIGS. 2A and 2B respectively.

The resulting breakthrough curves are processed using two methods breaking down the breakthrough curve and modeling the breakthrough curve. Both methods are detailed below.

Method 1: Breaking Down the Breakthrough Curve

The first method for evaluating the filtration consists of breaking down the breakthrough curve and analyzing the total trapping times. The total trapping times are determined for a methyl salicylate content of 0 ppm (t@0 ppm), a methyl salicylate content of less than 1 ppm (t<1 ppm), less than 5 ppm (t<5 ppm), and less than 20 ppm (t<20 ppm). These total trapping times are the characteristic times of the decomposition method.

Method 2: Modeling the Breakthrough Curve

The second method for evaluating the filtration consists of modeling the breakthrough curve by a sigmoid function according to the Hill model described below. This model was selected because, by definition, it allows modeling that starts from point (0.0), meaning a salicylate content of 0 ppm at t=0 min. This model, which comes from enzyme catalysis, models strictly positive data following a sigmoid function (S-shaped curve) which nicely corresponds to the breakthrough curves obtained by exposing sol-gel impregnated fabrics to methyl salicylate.

The characteristic time of the breakthrough curve modeling method is therefore: $t_{1/2}$. In addition, the slope of the curve can be calculated using the parameters of the model. Two points are required for this: A ($t_A$; $T_A$) and B ($t_B$; $T_B$). The calculation of the coordinates and slope are summarized in the table below.

Data Comparison: Normalization of Characteristic Times

The masses per unit area of the sol-gel depositions vary between 15 and 30 g/m². However, a data comparison is only possible at the same mass. To eliminate the differences in mass per unit area, the characteristic limes of the two methods described above were normalized to an average deposition of 20 g/m². In practice, the normalization is calculated as follows:

$$|t(\text{min})| = \frac{T_{characteristic}(\text{min})}{\text{Experimental mass per unit area (g/m}^2\text{)}} \times \text{Mass per unit area of 20 g/m}^2$$

In this manner, the data are correlated to identical weights: it is then possible to compare formulas.

2.2 Results

Exposure to Methyl Salicylate

The results of adhesion strategies I, II, and III are reported in Tables 2, 3, and 4 below for the methyl salicylate trapping efficiency.

TABLE 2

| Strategy Time (min) | I | | | | | |
|---|---|---|---|---|---|---|
| | $\|t_{@0\,ppm}\|$ | $\|t_{<1\,ppm}\|$ | $\|t_{<5\,ppm}\|$ | $\|t_{<20\,ppm}\|$ | $\|t_{1/2}\|$ | Slope (ppm/min) |
| Original fabric | 0.0 | 1.0 | 1.5 | 3.0 | 4.2 | 6.4 |
| Formula A | 0.0 | 5.0 | 8.3 | 14.2 | 16.0 | 2.1 |
| B | 0.0 | 1.1 | 1.7 | 3.3 | 4.3 | 5.7 |
| C | 0.0 | 2.2 | 3.9 | 6.1 | 9.1 | 5.6 |
| D | 0.0 | 4.4 | 6.3 | 8.8 | 13.4 | 4.9 |
| E | 0.0 | 8.8 | 11.9 | 16.3 | 21.7 | 3.9 |
| F | 0.0 | 0.6 | 1.6 | 6.1 | 12.9 | 1.8 |
| G | 0.0 | 0.8 | 3.2 | 10.0 | 15.8 | 1.7 |
| H | 0.0 | 8.0 | 11.3 | 17.3 | 21.5 | 3.0 |
| I | 6.1 | 8.7 | 11.3 | 16.5 | 18.9 | 2.1 |
| J | 2.6 | 4.3 | 6.1 | 9.6 | 12.6 | 5.3 |
| K | 0.0 | 3.8 | 5.2 | 8.1 | 11.8 | 3.2 |

TABLE 3

| Strategy Time (min) | II | | | | | |
|---|---|---|---|---|---|---|
| | $\|t_{@0\,ppm}\|$ | $\|t_{<1\,ppm}\|$ | $\|t_{<5\,ppm}\|$ | $\|t_{<20\,ppm}\|$ | $\|t_{1/2}\|$ | Slope (ppm/min) |
| Original fabric | 0.0 | 1.0 | 1.5 | 3.0 | 4.2 | 6.4 |
| Formula A | 21.6 | 23.7 | 27.2 | 34.1 | 37.3 | 2.1 |
| B' | 2.6 | 4.2 | 5.7 | 9.1 | 11.4 | 2.8 |
| C' | 14.9 | 17.1 | 20.1 | 26.8 | 30.3 | 2.2 |
| D' | 17.1 | 18.0 | 21.3 | 27.0 | 30.3 | 2.7 |
| E' | 13.8 | 15.1 | 17.2 | 21.6 | 24.5 | 3.1 |
| F' | 20.7 | 21.5 | 23.7 | 28.9 | 31.3 | 2.7 |
| G' | 20.4 | 21.5 | 23.7 | 31.5 | 35.7 | 2.1 |
| H' | 17.2 | 18.1 | 20.3 | 25.0 | 28.0 | 3.0 |
| I' | 20.2 | 21.2 | 24.0 | 31.7 | 35.1 | 2.2 |
| J' | 11.3 | 15.1 | 17.5 | 23.6 | 26.5 | 2.6 |
| K' | 8.0 | 10.7 | 13.4 | 17.9 | 20.4 | 3.3 |
| L'❶ | 34.0 | 38.6 | 47.3 | 63.5 | 72.9 | 1.4 |
| L'❷ | 28.7 | 35.3 | 44.0 | 58.6 | 62.6 | 1.3 |
| M' | 24.4 | 25.2 | 35.2 | 50.9 | 64.6 | 0.9 |
| N' | 28.4 | 38.0 | 48.4 | 61.3 | 69.3 | 1.9 |
| O' | 18.9 | 20.1 | 22.5 | 30.9 | 35.0 | 2.0 |
| P' | 7.9 | 11.1 | 16.3 | 23.0 | 33.0 | 1.5 |

TABLE 4

| Strategy Time (min) | III | | | | | |
|---|---|---|---|---|---|---|
| | $\|t_{@0\,ppm}\|$ | $\|t_{<1\,ppm}\|$ | $\|t_{<5\,ppm}\|$ | $\|t_{<20\,ppm}\|$ | $\|t_{1/2}\|$ | Slope (ppm/min) |
| Original fabric | 0.0 | 1.0 | 1.5 | 3.0 | 4.2 | 6.4 |
| Formula H" | 26.4 | 29.2 | 32.5 | 38.9 | 41.7 | 3.1 |
| L" | 45.0 | 56.8 | 102.6 | 133.3 | 151.5 | 1.1 |

The results obtained for methyl salicylate filtration show that all the formulations tested using adhesion strategy II according to the invention have better filtration performance than formulations prepared using adhesion strategy I according to the prior art based on the same sol-gel precursors. These results clearly demonstrate that the incorporation of polycarboxylic acid and catalyst modifies the sol-gel, making it unsuitable for a gas filtration application. The best result for methyl salicylate permeability is obtained with formulation L" using strategy ill.

Successive depositions were tested to increase the mass per unit area of the filtering material.

From 1 to 4 successive depositions of formulas J and A' were conducted as well as two different successive depositions of formulas N' and L'❶. These resulted in masses per unit area of between 12 and 47 g/m² for formulation J and 11 to 32 g/m² for A'. It should be noted that although adhesion is better with formulation J which contains poly basic carboxylic acid and catalyst (strategy I), the presence of the polyacid and catalyst has the effect of greatly reducing the filtration property in comparison to formulation A. The mass per unit area is 36 g/m² for N'+L'❶. Adhesion strategies I and II are compared in Table 5 below for their methyl salicylate trapping efficiency.

TABLE 5

| Successful depositions with strategy I | | | | | Successful depostions with strategy II | | | | |
|---|---|---|---|---|---|---|---|---|---|
| Formula | Num. of depos. | $t_{@0\,ppm}$ (min) | $t_{1/2}$ (min) | Slope (ppm/min) | Formula | Num. of depos. | $t_{@0\,ppm}$ (min) | $t_{1/2}$ (min) | Slope (ppm/min) |
| Original fabric | 0 | 0.0 | 4.2 | 6.4 | Original fabric | 0 | 0.0 | 4.2 | 6.4 |
| J | 1 | 5.2 | 11.8 | 5.1 | A' | 1 | 8.0 | 21.1 | 2.6 |
| | 2 | 7.3 | 18.5 | 4.2 | | 2 | 14.3 | 38.2 | 2.1 |
| | 3 | 5.0 | 18.9 | 2.8 | | 3 | 24.0 | 69.3 | 1.4 |
| | 4 | 7.3 | 24.6 | 2.0 | | 4 | 32.3 | 83.9 | 1.1 |
| | | | | | N' + L'❶ | 1 + 1 | 44.0 | 81.2 | 0.8 |

A deposition of formula L'❸ and two successive depositions of formulas N'+L'❸ were earned out on a Nomex® felt. These depositions resulted in masses per unit area of 510 (formula N' only) and 588 g/m$^2$ (N': 173 g/m$^2$+L'❸ : 415 g/m$^2$) respectively. These sol-gel impregnated materials were compared to a filtering layer using a technology based on activated carbon beads, representing the prior art and having a mass per unit area of 150 g/m$^2$ activated carbon and a specific surface area of 1770 m$^2$/g. Exposures to a concentration of 140 ppm methyl salicylate over 8 h resulted in the breakthrough curves given in FIG. 3.

The results show that without activated carbon, the formulations based on sol-gel alone can filter a high concentration of methyl salicylate in a similar manner to the prior art. More particularly, this trapping capacity is even greater in the case of successive depositions of N' and L'❸ . Indeed, the trapping time t @0 ppm is 2.3 h for activated carbon, while it is 3.0 hours for the successive depositions of N' and L'❸ . The slope of the breakthrough curve is also better, as values of 22 and 32 ppm/h are obtained for formula L'❸ and N'+L'❸ , while the prior art has a slope of 35 ppm/hr.

Exposure to Toluene

The adhesion strategies I, II, and III are compared in Tables 6, 7, and 8 below for their toluene trapping efficiency.

TABLE 6

| Strategy | | I | | | |
|---|---|---|---|---|---|
| Time (min) | | $\|t_{@0\,ppm}\|$ | $\|t_{<1\,ppm}\|$ | $\|t_{<2\,ppm}\|$ | $\|t_{<3\,ppm}\|$ |
| Original fabric | | 0.0 | 0.2 | 0.3 | 0.4 |
| Formula | A | 0.0 | 0.4 | 1.7 | 25.0 |
| | B | 0.0 | 0.2 | 0.2 | 0.3 |
| | C | 0.0 | 0.3 | 0.4 | 11.7 |
| | D | 0.0 | 0.7 | 0.9 | 1.7 |
| | E | 0.2 | 0.5 | 2.1 | 15.0 |
| | F | 0.0 | 0.2 | 34.2 | 88.3 |
| | G | 0.0 | 0.2 | 27.5 | 70.8 |
| | H | 0.2 | 0.4 | 16.7 | 68.3 |
| | I | 0.0 | 0.2 | 0.5 | 20.8 |
| | J | 0.0 | 0.3 | 5.0 | 51.7 |
| | | | 0.4 | 13.3 | 48.3 |

TABLE 7

| Strategy | | II | | | |
|---|---|---|---|---|---|
| Time (min) | | $\|t_{@0\,ppm}\|$ | $\|t_{<1\,ppm}\|$ | $\|t_{<2\,ppm}\|$ | $\|t_{<3\,ppm}\|$ |
| Original fabric | | 0.0 | 0.2 | 0.3 | 0.4 |
| Formula | A' | 0.1 | 0.3 | 22.8 | 49.7 |
| | B' | 0.0 | 0.2 | 0.5 | 12.4 |
| | C' | 0.1 | 0.6 | 8.3 | 20.7 |

TABLE 7-continued

| Strategy | II | | | |
|---|---|---|---|---|
| Time (min) | $\|t_{@0\,ppm}\|$ | $\|t_{<1\,ppm}\|$ | $\|t_{<2\,ppm}\|$ | $\|t_{<3\,ppm}\|$ |
| D' | 0.2 | 0.4 | 0.5 | 3.0 |
| E' | 0.4 | 1.7 | 4.0 | 11.0 |
| F' | 0.1 | 0.5 | 14.5 | 35.9 |
| G' | 0.2 | 0.9 | 23.4 | 46.9 |
| H' | 0.2 | 3.4 | 21.4 | 55.2 |
| I' | 0.5 | 5.9 | 22.1 | 77.2 |
| J' | 0.2 | 0.4 | 0.5 | 1.7 |
| K' | 0.8 | 4.4 | 8.3 | 15.9 |
| L'❶ | 4.5 | 20.2 | 38.4 | 85.6 |
| L'❷ | 0.7 | 20.1 | 43.1 | 94.8 |
| M' | 0.0 | 4.0 | 11.1 | 26.6 |
| N' | 0.0 | 5.7 | 12.0 | 23.9 |

TABLE 8

| Strategy | | III | | | |
|---|---|---|---|---|---|
| Time (min) | | $\|t_{@0\,ppm}\|$ | $\|t_{<1\,ppm}\|$ | $\|t_{<2\,ppm}\|$ | $\|t_{<3\,ppm}\|$ |
| Original fabric | | 0.0 | 0.2 | 0.3 | 0.4 |
| Formula | H" | 0.3 | 0.4 | 0.8 | 28.0 |
| | L" | 0.0 | 4.0 | 8.2 | 96.0 |

The results differ more for the toluene permeability than those obtained for the methyl salicylate permeability. In fact, the results indicate that the adhesion strategy used has an influence on filtration performance, with the exception of formulas G and H where the results are similar for both strategies I and II. Improved toluene filtration performance is observed with adhesion strategy II in 6 tests out of 9. The best results for toluene permeability are obtained with formulation L'❶ , which also gave the best performance for methyl salicylate.

Successive depositions were tested in order to increase the mass per unit area of the filtering material.

From 1 to 4 successive depositions of formulas J and A' were performed. These resulted in masses per unit area of between 12 and 47 g/m$^2$ for formulation J and 11 to 32 g/m$^2$ for A'. Adhesion strategies I and II are compared in Table 9 below for their toluene trapping efficiency.

TABLE 9

| Successful depositions with strategy I | | | | | Successful depositions with strategy II | | | | |
|---|---|---|---|---|---|---|---|---|---|
| Formula | Num. of depos. | $\lvert t_{@0\,ppm} \rvert$ (min) | $t_{<2\,ppm}$ | $t_{<3\,ppm}$ | Formula | Num. of depos. | $\lvert t_{@0\,ppm} \rvert$ (min) | $t_{<2\,ppm}$ | $t_{<3\,ppm}$ |
| Orginal fabric | 0 | 0.0 | 0.3 | 0.4 | Original fabric | 0 | 0.0 | 0.3 | 0.4 |
| J | 1 | 0.0 | 0.5 | 15.0 | A' | 1 | 0.3 | 1.0 | 2.1 |
| | 2 | 0.0 | 10.3 | 76.3 | | 2 | 0.3 | 1.6 | 15.8 |
| | 3 | 0.0 | 56.0 | 135.0 | | 3 | 0.2 | 15.8 | 28.7 |
| | 4 | 0.0 | 68.0 | 182.0 | | 4 | 0.2 | 29.5 | 46.0 |

The same results are observed as for methyl salicylate exposure. Despite a higher mass per unit area for formulation J than for A', the presence of polybasic carboxylic acid and catalyst has the effect of reducing the filtration properties of media J.

Example 3: Polarity and Porosity of Sol-Gel Materials

The porosity of the sol-gel materials was determined from nitrogen adsorption isotherms (specific surface area, pore volume, pore size distribution). The intrapore polarity is revealed by the capacity of the material to trap methyl salicylate more efficiently in comparison to toluene.

3.1 Materials and Methods

Nitrogen adsorption consists of the physisorption of nitrogen on the surface of a solid: it is a reversible process (adsorption/desorption). Nitrogen adsorption is a volumetric technique: a volume of gas of known temperature and pressure is sent over the previously degassed sample, and maintained at the temperature of liquid nitrogen. An adsorption isotherm corresponding to the adsorbed volume of gas as a function of the partial pressure of nitrogen is established. Interpretation of the adsorption isotherm is based on various analytical models: the Brunauer, Emmett and Teller (BET) model which is a model of the adsorption of a monolayer of nitrogen molecules into the pores, and a model based on the theory of functional density which uses Monte Carlo methods to reproduce the adsorption isotherm for pores of a given size. These analyses provide three pieces of information: the adsorption specific surface area, the pore volume, and the pore size distribution. The analyses were performed using the Quantachrome "Autosorb-1" porosity analyzer.

3.2 Results

Table 10 below summarizes the polarity and porosity of monolith sol-gel materials obtained from the formulation of Example 1, by nitrogen adsorption (specific surface area, pore volume, pore size distribution).

TABLE 10

| Formula | Specific surface area ($m^2/g$) $S_{BET}$ | $S_{DFT}$ | Pore volume ($cm^3/g$) | Pore size distribution of micro-, meso-, macropores (%) <20 Å | 20-500 Å | >500 Å |
|---|---|---|---|---|---|---|
| A | 472 ± 30 | 316 ± 20 | 0.310 | 0 | 100 | 0 |
| G | 290 ± 30 | 200 ± 20 | 0.14 | 0 | 100 | 0 |
| I | 81 ± 30 | 62 ± 20 | 0.038 | 8 | 92 | 0 |
| A' | 760 ± 30 | 711 ± 20 | 0.405 | 43 | 57 | 0 |
| B' | 735 ± 30 | 581 ± 20 | 0.565 | 5 | 95 | 0 |
| C' | 865 ± 30 | 640 ± 20 | 0.504 | 0 | 99 | 1 |
| D' | 422 ± 30 | 399 ± 20 | 0.753 | 0 | 100 | 0 |
| E' | 340 ± 30 | 346 ± 20 | 0.690 | 0 | 100 | 0 |
| F' | 877 ± 30 | 820 ± 20 | 0.475 | 59 | 41 | 0 |
| G' | 743 ± 30 | 755 ± 20 | 0.376 | 48 | 52 | 0 |
| I' | 546 ± 30 | 459 ± 20 | 0.694 | 8 | 92 | 0 |
| J' | 366 ± 30 | 371 ± 20 | 0.751 | 0 | 100 | 0 |
| K' | 387 ± 30 | 364 ± 20 | 0.765 | 0 | 100 | 0 |
| L' | 545 ± 30 | 644 ± 20 | 0.257 | 74 | 26 | 0 |
| N' | 332 ± 30 | 291 ± 20 | 0.163 | 50 | 50 | 0 |

Example 4: Properties of the Impregnated Fabrics

Flexibility

The flexibility of the fabrics impregnated with the sol-gel formulations was evaluated using the flexibility measurement tool represented in FIG. 4A. The tool 1 consists of two parts, a lower part 2 serving as a support for the fabric T and an upper part 3 which fits onto the lower part to immobilize the fabric T. FIG. 4B shows the functional diagram for the measurement. To obtain a measurement, 5 cm of fabric are positioned "in vacuo" (in other words outside the measurement tool), a picture from a side view is taken, and in this side view the angle α formed between the fabric and the vertical is measured using a protractor to assess the drape of the fabric.

This tool makes it possible to compare samples against a reference sample (fabric without sol-gel), as is shown in the photos in FIG. 5.

Table 11 below summarizes the flexibility measurements before/after the sol-gel deposition.

TABLE 11

| Adhesion strategy | α (Original fabric) | α (Fabric + preparation) | α (Fabric + sol-gel) |
|---|---|---|---|
| I | 18° | N/A | 37° (Fabric + Formula H) |
| II | 18° | N/A | 38° Fabric + Formula H' |
| III | 18° | 23° Fabric + Deposition of $H''_1$ | 23° Fabric + Formula H'' (Depositions of $H''_1$ and $H''_2$) |

Air Permeability

The concept of breathability is related to air permeability. Air permeability measurements were performed according to standard ISO9237:1995 at 100 Pa. Table 12 below summarizes the data for the original fabrics and the fabrics impregnated with formulation H with the various adhesion strategies.

TABLE 12

| Adhesion strategy | Formula | Test | Air permeability ($L/m^2 \cdot s$) Meas. 1 | Meas. 2 | Meas. 3 | Meas. 4 | Mean ($L/m^2 \cdot s$) | Max-min | CV* (%) |
|---|---|---|---|---|---|---|---|---|---|
| Original fabric | — | | 128 | 142 | 147 | 139 | 139 | 19 | 5.0 |
| Strategy Type | H | A | 113 | 110 | 118 | 120 | 115 | 10 | 4.0 |
| | H | B | 118 | 138 | 138 | N/A | 131 | 20 | 8.8 |
| Strategy II | H' | C | 206 | 208 | 211 | 204 | 207 | 7 | 1.4 |
| | H' | D | 212 | 201 | 206 | 205 | 206 | 11 | 2.2 |
| Strategy III | H" | E | 162 | 168 | 165 | 158 | 163 | 10 | 2.6 |
| | H" | F | 149 | 170 | 169 | 182 | 168 | 33 | 4.5 |

*The CV (coefficient of variation) is calculated as follows: CV (%) = Standard deviation/Mean × 100

Note that the air permeability of fabrics impregnated with formulation H (strategy I) suffers a slight loss. However, in a remarkable and reproducible manner, the permeability values of fabrics impregnated with the H' (strategy II) and H' (strategy III) formulations are higher than that of the original fabric. This highly reproducible phenomenon was interpreted as a sheathing of the fibers which leaves them perfectly smooth by reducing the inter-fiber irregularities which could reduce the rate of the air penetration. This increase in permeability does not affect the filtration properties (H<H'<H").

Washing Resistance

Fabrics impregnated with formulas H, H', and H" were evaluated for their resistance to washings at 60° C. with intermediate tumble drying according to the ISO 6330:2012 standard.

Appearance

Sol-gel deposition does not change the appearance of the original fabric. Similarly, the successive washings do not affect the appearance of the fabric.

Hydrophobia

The hydrophobic properties of the fabrics impregnated with the H (strategy I), H' (strategy II), and H" (strategy III) formulations were determined by contact angle measurements using the DataPhysics OCA 15EC goniometer and the SCA20 software in dynamic mode, capturing 4 measurements per second for 1 min in order to determine the stability of the water drop (10 μL) on the fabric. The data are presented as follows: before washing/after 1-5-10-25 washes. Table 13 below summarizes the mean contact angles for 1 min. accompanied by photos taken at the end of the measurement in dynamic mode.

TABLE 13

| Fabric | Mean contact angle for 1 min (°)/CV (%) Before washing | 1 wash | 5 washes | 10 washes | 25 washes |
|---|---|---|---|---|---|
| H | 147°/0.24% | 142°/0.35% | From 133 to 82° | — | — |
| H' | 145°/0.11% | 142°/0.27% | From 127 to 0° | — | — |
| P' | 145°/0.57% | 141/0.49% | 130/0.06% | 128/1.68% | From 113 to 91° |
| H" | 131°/0.30% | 134°/0.78% | 134°/0.56% | From 122 to 88° | — |

Based on the hydrophobic properties, the adhesion strategy of the invention without poly carboxylic acid and without catalyst is better than the adhesion strategy of the prior art, because the contact angle remains stable at 10 washes in comparison to one wash for the prior art.

Energy Dispersive Analysis (SEM/EDS)

To quantify the amount of filtering medium remaining after each series of washes, the fabrics impregnated with fluorinated sol-gel H, H', O', P' and H" were characterized by energy-dispersive analysis (combined SEM/EDS) before and after washing.

Scanning electron microscopy (SEM) is a powerful technique for observing the surface topography. It is based primarily on the detection of secondary electrons emerging from a surface under the impact of a very fine beam of primary electrons that scans the observed surface and provides images with a resolving power often under 5 nm and a large depth of field. The instrument makes it possible to form a near-parallel beam, very thin (to a few nanometers), of electrons that are highly accelerated by voltages adjustable from 0.1 to 30 keV in order to focus it on the area to be examined, and to scan it progressively. Appropriate sensors collect significant signals while scanning the surface and form a variety of significant images from them. Images of the fabric samples were collected using the Zeiss "Ultra 55" SEM. The samples are observed directly without any particular deposition (metal, carbon). A low acceleration voltage of 3 keV and an InLens detector (detector of backscattered and secondary electrons) are used for the sample observations and to prevent a phenomenon of too much load due to the nature of the fabrics.

Energy dispersive X-ray analysis (EDS) constitutes an electron microanalysis. The impact of the electron beam on the sample produces X-rays characteristic of the sample elements. In practice, this involves using an X-ray detector (energy detector) installed on the SEM (Zeiss Ultra 55). This characterization technique provides morphological information (images) and chemical information (elemental composition). The elemental composition can be obtained as a spectrum or a map. In a context of analyzing textile materials, the elemental composition is determined by spectrum acquisition. Two to three sample areas are analyzed in order to obtain representative average quantifications. Analysis of the reference materials (fabric without sol-gel and with sol-gel only in monolith form) was performed to ensure consistency in the results obtained for the samples before/after washing. The Broker Quantax detector and the "Esprit" EDS analytical software were used to obtain the EDS results for the fabrics tested.

Table 14 below summarizes the mass percentages of silicon that were obtained from three measurement areas on each sample (H, H', H"), as well as the amount of silicon remaining after the washes which is calculated as follows:

$$\text{Silicon remaining after } x \text{ washes } (\%) = \frac{\%_{weight}Si \text{ after } x \text{ washes}}{\%_{weight}Si \text{ before } x \text{ washes}} \times 100$$

TABLE 14

| | Mass percentage of Si (% by weight) Number of washes | | | | | Si remaining after washes (% by weight) Number of washes | | | |
|---|---|---|---|---|---|---|---|---|---|
| Fabric | 0 | 1 | 5 | 10 | 25 | 1 | 5 | 10 | 25 |
| H | 4.16 | 2.52 | 0.06 | 0.17 | 0.05 | 61 | 1 | 4 | 1 |
| H' | 7.52 | 0.58 | 0.83 | 0.33 | 0.16 | 8 | 11 | 4 | 2 |
| O' | 8.14 | 2.94 | 0.29 | 0.12 | 0.03 | 36 | 4 | 2 | 0 |
| P' | 10.73 | 1.49 | 0.56 | 0.14 | 0.15 | 14 | 5 | 1 | 1 |
| H" | 3.45 | 0.71 | 0.44 | 0.89 | 0.14 | 21 | 13 | 26 | 4 |

The SEM images of the invention show the presence of sol-gel material at the fiber surface even after 10 washes. The elemental composition by EDX analysis confirms this presence and indicates ~20% Silicon by weight after 1, 5, and 10 washes. Furthermore, composition H" (strategy II) is based on zirconium, an element that is also qualifiable and quantifiable. The line Lα for zirconium has an energy of 2.04 keV. It is still detectable and quantifiable after 25 washes (0.68% by weight which corresponds to 14% of the Zr remaining after 25 washes).

Exposure to Pollutants Before/after Washing

TABLE 15

| Fabric | Breakdown of breakthrough curves $\|t_{0ppm}\|$* (min) | Modeling of breakthrough curves $\|t_{1/2}\|$* (min) | Filtration capacity of methyl salicylate after washes (%) Number of washes 0 | 1 | 5 | 10 | 25 |
|---|---|---|---|---|---|---|---|
| H | 7.7 | 15.6 | 100 | 75 | 0 | — | — |
| H' | 20.0 | 37.1 | 100 | 0 | — | — | — |
| O' | 18.9 | 35.0 | 100 | 45 | 14 | 7 | 4 |
| P' | 7.9 | 33.0 | 100 | 55 | 34 | 0 | — |
| H" | 26.4 | 41.7 | 100 | 11 | 1 | — | — |
| N' + L' ❶ | 24.2 | 44.6 | 100 | 31 | 8 | 3 | — |

*The characteristic times were normalized for a mean deposition of 20 g/m$^2$.

Example 4: Abrasion Test

Appearance

Abrasion of the deposition of formula A' was tested according to the NF EN ISO 12947-2:1998 standard, and compared to the original fabric without sol-gel. The results obtained after 10,000 abrasion revolutions (10× 1000 revolutions) with a pressure of 9 kPa are show n in FIG. 6.

Viewed from above, fabrics with or without sol-gel have the same appearance: the presence of sol-gel therefore does not affect the abrasion resistance. Viewed from the side, the photo shows that the original fabric (without sol-gel) is more hairy than the same fabric covered with formula A'. This observation is an advantage for the deposition of sol-gel on textiles.

Scanning Electron Microscopy

The deposition of formula A' was characterized by SEM, in a top view and cross-sectional view before and after abrasion.

The fabric used for the depositions is made of threads, and a thread of this fabric is made of an intimate mixture of textile fibers of Kennel and viscose. The SEM images before abrasion show the formation of a sol-gel sheath around the textile fibers (FIG. 7, cross-sectional view) and not around the threads. This sol-gel sheath is uniform (FIG. 8, top view), in other words it does not present any cracks. After abrasion, one can see the appearance of cracks but material remains on the surface of the fibers.

FTIR-ATR Spectroscopy

The fabric impregnated with sol-gel A' was characterized by FTIR-ATR spectroscopy in reflection mode before and after abrasion. Spectra were recorded following 100 scans with a resolution of 4 cm$^{-1}$ using the Broker "Alpha-P" FTIR-ATR module.

The IR spectrum (FIG. 9) confirms the presence of sol-gel after abrasion. The IR spectrum obtained after abrasion is less intense than the one obtained before abrasion, as is logical. Integration of the differential spectra in the 1000-1300 cm$^{-1}$ region is used to evaluate the amount of sol-gel remaining after abrasion. Table 15 below summarizes the results.

TABLE 16

| | Area obtained by integration of the 1000-1300 $cm^{-1}$ region | Sol-gel remaining after abrasion |
|---|---|---|
| Sol-gel A' before abrasion | 3.22 | |
| Sol-gel A' after abrasion | 1.36 | 42% (1.36/3.22 × 100 = 42) |

These measurements confirm the presence of sol-gel after abrasion. The use of FTIR-ATR spectroscopy indicates the presence of about 40% of the sol-gel on the fabric based on the differential spectra.

Example 5: Textile Material Impregnated with Immobilized Sol-Gel Pellets 5.1 Preparation of Sol-Gel Pellets In order to obtain the sol-gel pellets, a honeycomb mold of polycarbonate having a diameter of 3.0 mm (±0.3) available from Plascore (reference PC-3.0-CL) was used. The 3 mm diameter honeycomb plates were cut in order to fit into Petri dishes 11.5 and 10.8 cm in diameter.

In parallel, the TMOS/PhTMOS 85/15 sol-gel formula was prepared in the manner described below. In a hermetically sealable glass flask, 40.41 mL TMOS and 9.184 mL PhTMOS are added to a mixture of 45.83 mL ultrapure water and 4.58 mL ethanol. The formula is stirred at room temperature (20-22° C.) at setting 10 of the IKA WERKE RO10 Power multistirrer plate (about 1000 rpm). The reactants are not miscible when added, then as the reaction advances the formula becomes clear. Before deposition in a Petri dish, the viscosity of the formula is 19.9 mPa·s and the pH is 4.0-4.5.

In Petri dishes 11.5 and 10.8 cm in diameter, a sol-gel volume of 31.1 and 27.5 $cm^3$ respectively is necessary in order to obtain a sol-gel height of 0.3 cm in the honeycomb mold. Once the sol-gel formula (liquid) is placed in the Petri dish containing the honeycomb, a sealing film (aluminized) is adhered to the Petri dish. The three prepared Petri dishes are then placed on a multilevel rack and introduced into a desiccator with no gas flow. After two weeks at room temperature, the sol-gel has detached from the honeycomb. To complete the drying of the pellets, a breathable film is placed on the Petri dishes and the dessicator is flushed with a stream of argon gas of about IL/min.

The sol-gel pellets obtained are uniform in size. Weighing the flask indicates 14.3 g of sol-gel pellets. Measurement of a cylindrical pellet indicates a diameter of about 18 mm and a thickness of about 1.7 mm, which is a reduction of about 45% compared to the dimensions of the mold. The pellets have a BET surface area of 497 $m^2/g$ and a DFT surface area of 469 $m^2/g$. The pore volume is 0.270 $cm^3/g$. The pore size distribution indicates 46% microporosity and 54% mesoporosity.

5.2 Pellet Deposition on Textile

In order to increase the mass per unit area of sol-gel, the intended deposition consists of immobilizing the sol-gel pellets by trapping them between two lay ers of textile materials within containment areas defined by stitching.

The photos shown in FIG. 10 illustrate this method of immobilizing the sol-gel pellets. Photo (A) shows the containment rows defined by stitching on an area of approximately 10×10 cm. Two layers of 50/50 Kermel/viscose having an air permeability of approximately 680 $L/m^2·s$ are used. The sol-gel pellets are introduced into each row using a pipette that can reach the end of the containment row (photos (B1) and (B2)). After fixe pellets are introduced into each containment row, a line of stitching finishes defining the containment area. In the same manner, five pellets are introduced all the way to the new end so defined, and then a new line of stitching defines a new containment area. In this manner, the entire initial area of about 10×10 cm has been covered with 11×11 cm of containment areas each holding five pellets of sol-gel. Photos (C1) and (B2) show the final result.

The resulting textile material is homogeneous, regular, and flexible, having a mass of 2.94 g of TMOS/PhTMOS 85/15 pellets over a surface area of 112 $cm^2$ of 50/50 Kermel/viscose fabric, which is a mass per unit area of 262 $g/m^2$ of sol-gel.

The air permeability of the fabric with the sol-gel pellets indicates an average value of 702 $L/m^2·s$, while the same fabric without the sol-gel pellets indicates a value of 680 $L/m^2·s$ (applying the ISO 9237 standard at 100 Pa). Despite the significant mass per unit area of sol-gel, incorporation of the pellets does not influence air permeability.

A filtration test for methyl salicylate was carried out with the above prepared fabric with and without sol-gel pellets. This previously sewn fabric was cut using a punch of 37 mm diameter.

Weights for the cut circles were:

| Item | Mass |
|---|---|
| Original fabric without sol-gel pellets | 354 mg |
| Fabric with sol-gel pellets | 704 mg |
| Sol-gel pellets (mg) | 350 mg |
| Sol-gel pellets ($g/m^2$) | 325 $g/m^2$ |

The filtration results show that a clear difference in filtration performance is observed between the original textile and the textile incorporating the pellets (FIG. 11). However, the breakthrough curve obtained with the textile incorporating the pellets does not have the usual S-shape. To attempt to quantify the results, a calculation of the area under the breakthrough curve was used. For this, the areas of the breakthrough curves of the original textile without pellets and of the textile incorporating the sol-gel pellets were compared to the area without fabric in order to determine the passage of methyl salicylate as a percentage. Calculations performed using Origin software at 10 min and 300 min and the corresponding curves are presented below.

| Test | Integration over 10 min Area (a.u.) | Methyl salicylate passage after 10 min | Integration over 300 min Area (a.u.) | Methyl salicylate passage after 300 min |
|---|---|---|---|---|
| Without fabric | 520 | 100% | 15990 | 100% |
| Fabric alone | 337 | 78% | 15668 | 98% |
| Fabric + pellets | 81 | 16% | 10830 | 68% |

The filtration results for methyl salicylate clearly show the advantage of the immobilization of sol-gel pellets between two layers of textile materials. It will be even more significant when at least one of the two layers is an impregnated textile material according to the invention.

The invention claimed is:

1. A method for coating a textile material with a sol-gel material, said method comprising the steps of:

a) providing a coating composition comprising an aqueous solvent and an organosilicon precursor, b) impregnating the textile material with the coating composition by means of pad finishing, c) drying the impregnated textile material, characterized in that the coating composition contains no polycarboxylic acid or catalyst.

2. The method according to claim 1, wherein the coating composition also contains no surfactant.

3. The method according to claim 1, wherein the textile material is a woven fabric, a nonwoven fabric, or a knit, preferably a woven fabric.

4. The method according to claim 1, wherein the textile material comprises fibers having hydrolysable functional groups, such as hydroxyl functional groups.

5. The method according to claim 1, wherein the aqueous solvent is water or a mixture of water and an organic solvent.

6. The method according to claim 1, wherein the organosilicon precursor is selected among tetramethoxysilane (TMOS), tetraethoxysilane (TEOS), methyl trimethoxysilane (MTM), methyl triethoxysilane (MTE), phenyltrimethoxysilane (PhTMOS), phenyltriethoxysilane (PhTEOS), a fluoroalkyltrimethoxysilane, a fluoroalkyltriethoxysilane, a chloroalkylmethoxysilane, a chloroalkylethoxysilane, an aminopropyltrimethoxysilane (APTES), aminopropyltriethoxysilane (APTMS), (3-glycidyloxypropyl)trimethoxysilane (GPTMOS), (3-glycidyloxypropyl) triethoxysilane (GPTEOS), and mixtures thereof preferably among tetramethoxysilane (TMOS), methyl trimethoxysilane (MTM), phenyltrimethoxysilane (PhTMOS), a fluoroalkyltrimethoxysilane, a chloroalkylmethoxysilane, an aminopropyltriethoxysilane (APTES), (3-glycidyloxypropyl) trimethoxysilane (GPTMOS), and mixtures thereof.

7. The method according to claim 6, wherein the organosilicon precursor is tetramethoxysilane (TMOS).

8. The method according to claim 6, wherein the organosilicon precursor is a mixture of tetramethoxysilane (TMOS) with one or more precursors selected among methyl trimethoxysilane (MTM), methyl triethoxysilane (MTE), phenyltrimethoxysilane (PhTMOS), phenyltriethoxysilane (PhTEOS), a fluoroalkyltrimethoxysilane, a fluoroalkyltriethoxysilane, a chloroalkylmethoxysilane (ClTMOS), a chloroalkylethoxysilane, an aminopropyltriethoxysilane (APTES), (3-glycidyloxypropyl) trimethoxysilane (GPTMOS), and mixtures thereof.

9. The method according to claim 8, wherein the organosilicon precursor is a mixture of tetramethoxysilane (TMOS) with (3-glycidyloxypropyl) trimethoxysilane (GPTMOS).

10. The method according to claim 1, wherein it comprises several successive cycles of impregnation by pad finishing.

11. The method according to claim 1, wherein it comprises, before step b), a step of applying a precoating composition comprising an organic solvent and a zirconium alkoxide, said precoating composition containing no polycarboxylic acid or catalyst.

12. The method according to claim 1, wherein it further comprises a step of immobilizing sol-gel pellets on at least one of the two sides of the impregnated textile material.

13. The method according to claim 12, wherein the step of immobilizing the sol-gel pellets is carried out after the drying step c).

14. The method according to claim 12, wherein it comprises, after the drying step c), the application of a second layer of textile material on the impregnated textile material.

15. The method according to claim 14, wherein the second layer of textile material is secured to the impregnated textile material, in particular by stitching, welding, or gluing.

16. A coating composition, comprising an aqueous solvent and an organosilicon precursor, characterized in that it contains no polycarboxylic acid or catalyst.

17. The coating composition according to claim 16, wherein the aqueous solvent is water or a mixture of water and an organic solvent.

18. The coating composition according to claim 16, wherein the organosilicon precursor is selected among tetramethoxysilane (TMOS), tetraethoxysilane (TEOS), methyl trimethoxysilane (MTM), methyl triethoxysilane (MTE), phenyltrimethoxysilane (PhTMOS), phenyltriethoxysilane (PhTEOS), a fluoroalkyltrimethoxysilane, a fluoroalkyltriethoxysilane, a chloroalkylmethoxysilane, a chloroalkyltriethoxysilane, an aminopropyltriethoxysilane, (3-glycidyloxypropyl)trimethoxysilane (GPTMOS), and mixtures thereof; preferably among tetramethoxysilane (TMOS), methyl trimethoxysilane (MTM), phenyltrimethoxysilane (PhTMOS), a fluoroalkyltrimethoxysilane, a fluoroalkyltriethoxysilane, a chloroalkylmethoxysilane, an aminopropyltriethoxysilane, (3-glycidyloxypropyl) trimethoxysilane (GPTMOS), and mixtures thereof.

19. The coating composition according to claim 18, wherein the organosilicon precursor is tetramethoxysilane (TMOS).

20. The coating composition according to claim 18, wherein the organosilicon precursor is a mixture of tetramethoxysilane (TMOS) with a precursor selected among methyl trimethoxysilane (MTM), methyl triethoxysilane (MTE), phenyltrimethoxysilane (PhTMOS), phenyltriethoxysilane (PhTEOS), fluoroalkyltrimethoxysilane, fluoroalkyltriethoxysilane, chloroalkylmethoxysilane, chloroalkyltriethoxysilane, aminopropyltriethoxysilane, (3-glycidyloxypropyl)trimethoxysilane (GPTMOS), and mixtures thereof.

21. The coating composition according to claim 20, wherein the organosilicon precursor is a mixture of tetramethoxysilane (TMOS) with (3-glycidyloxypropyl) trimethoxysilane (GPTMOS).

22. The coating composition according to claim 20, wherein the organosilicon precursor is a mixture of tetramethoxysilane (TMOS) with phenyltrimethoxysilane (PhTMOS).

23. An impregnated textile material obtained using the coating method according to claim 1.

24. The impregnated textile material according to claim 23, wherein the sol-gel material forms a sheathing around the fibers of the textile material.

25. The impregnated textile material according to claim 23, wherein it has a specific surface area $S_{BET}$, determined from adsorption isotherms using the Brunauer, Emmet and Teller (BET) model, between 330±30 and 880±30 $m^2 \cdot g^{-1}$, in particular between 540±30 and 880±30 $m^2 \cdot g^{-1}$.

26. The impregnated textile material according to claim 23, wherein it has a micropore proportion greater than 0%, preferably greater than 30%, and even more preferably greater than 50%.

27. The impregnated textile material according to claim 23, wherein it has a mesopore proportion of less than 100%, preferably less than 70%, and even more preferably less than 50%.

28. The impregnated textile material according to claim 23, wherein it has a mass per unit area of 1 to 500 $g/m^2$, preferably from 5 to 400 $g/m^2$, more preferably from 10 to 300 $g/m^2$.

29. The impregnated textile material according to claim 23, wherein it further comprises sol-gel pellets immobilized on at least one of its sides.

30. The impregnated textile material according to claim 29, wherein it has a mass per unit area of 60 to 500 $g/m^2$, preferably 80 to 400 $g/m^2$, and more preferably from 100 to 300 $g/m^2$.

31. A gas filter, comprising the impregnated textile material according to claim 23.

32. A personal protective equipment, comprising the impregnated textile material according to claim 23.

33. The personal protective equipment according to claim 32, wherein it is NBC personal protective equipment.

* * * * *